US009644725B2

(12) United States Patent
Robles

(10) Patent No.: US 9,644,725 B2
(45) Date of Patent: May 9, 2017

(54) SHIFT SYSTEM FOR POWER TRANSFER UNIT USING NON-CONTACTING POSITION SENSOR

(71) Applicant: Magna Powertrain of America, Inc., Troy, MI (US)

(72) Inventor: Enrique Robles, Rochester Hills, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 41 days.

(21) Appl. No.: 14/751,455

(22) Filed: Jun. 26, 2015

(65) Prior Publication Data
US 2016/0377156 A1    Dec. 29, 2016

(51) Int. Cl.
| F16H 37/06 | (2006.01) |
| F16H 3/46 | (2006.01) |
| F16H 7/06 | (2006.01) |
| F16H 7/08 | (2006.01) |
| F16H 61/02 | (2006.01) |
| B60K 17/346 | (2006.01) |
| G01D 5/14 | (2006.01) |

(52) U.S. Cl.
CPC ....... *F16H 37/065* (2013.01); *B60K 17/3467* (2013.01); *F16H 3/46* (2013.01); *F16H 7/06* (2013.01); *F16H 7/0827* (2013.01); *F16H 61/0204* (2013.01); *G01D 5/142* (2013.01); *F16H 2200/0034* (2013.01); *F16H 2200/2005* (2013.01); *F16H 2200/2033* (2013.01)

(58) Field of Classification Search
CPC . F16H 3/46; F16H 7/06; F16H 7/0827; F16H 37/065; B60K 17/3467; G01D 5/142
See application file for complete search history.

(56) References Cited

U.S. PATENT DOCUMENTS

| 4,060,157 | A | 11/1977 | Hillstrom |
| 4,704,917 | A | 11/1987 | Hiroyasu |
| 4,770,280 | A | 9/1988 | Frost |
| 5,159,847 | A | 11/1992 | Williams et al. |
| 5,420,565 | A | 5/1995 | Holbrook |
| 5,625,289 | A | 4/1997 | Daetz et al. |
| 5,713,243 | A | 2/1998 | Williams et al. |
| 5,743,143 | A | 4/1998 | Carpenter et al. |
| 5,867,092 | A | 2/1999 | Vogt |
| 6,230,577 | B1 | 5/2001 | Showalter et al. |
| 7,624,659 | B2 | 12/2009 | Futamura et al. |
| 8,258,779 | B2 | 9/2012 | Wenzel et al. |
| 2013/0263684 | A1* | 10/2013 | McCloy ............... B60K 17/344 74/473.36 |

* cited by examiner

*Primary Examiner* — Jacob S Scott
(74) *Attorney, Agent, or Firm* — Dickinson Wright PLLC

(57) ABSTRACT

A two-speed active transfer case is disclosed having a range shift mechanism with a moveable range shift component and a contactless position sensing arrangement for detecting the position of said moveable range shift component.

21 Claims, 15 Drawing Sheets

SHIFT SYSTEM FOR POWER TRANSFER UNIT USING NON-CONTACTING POSITION SENSOR

FIELD

The present disclosure relates generally to power transfer systems configured to control the distribution of drive torque from a powertrain to front and rear drivelines of a four-wheel drive vehicle. More particularly, the present disclosure is directed to a two-speed transfer case equipped with a range shift mechanism having a contactless position sensor configured to detect the position of a moveable range shift component.

BACKGROUND

This section provides background information related to the present disclosure which is not necessarily prior art.

In view of the high consumer interest in four-wheel drive motor vehicles, power transfer systems are currently being utilized in vehicular drivelines for selectively and/or automatically directing power (i.e., drive torque) from the powertrain to all four wheels of the vehicle. In many such power transfer systems, a power splitting device, such as a transfer case, is incorporated into the drivetrain for connecting the powertrain to the front and rear drivelines of the vehicle. Typically, the transfer case is configured to normally transmit drive torque from the powertrain to the rear driveline for driving the rear wheels and establishing a two-wheel drive (2WD) mode. The transfer case also includes a transfer mechanism drivingly coupled to the front driveline, and a mode shift mechanism configured to be selectively actuated for transmitting a portion of the drive torque from the powertrain to the front driveline via the transfer mechanism for also driving the front wheels and establishing a four-wheel drive (4WD) mode.

In "part-time" power transfer systems, the mode shift mechanism may include a positive-locking (i.e., dog-type) mode clutch assembly and a mechanically-operated mode clutch actuator configured to permit the vehicle operator to selectively engage the mode clutch assembly, thereby directly coupling the front and rear drivelines and establishing a part-time or locked four-wheel drive (LOCK-4WD) mode. It is also known to use "on-demand" power transfer systems for automatically and variably distributing drive torque between the front and rear wheels, without any input or action on the part of the vehicle operator, when traction is lost at either the front or rear wheels. Modernly, it is known to incorporate the on-demand feature into a transfer case by replacing the mechanically-actuated mode clutch assembly with a multi-plate mode clutch assembly and a power-operated mode clutch actuator that are interactively associated with an electronic control system and a sensor arrangement. During normal road conditions, the multi-plate mode clutch assembly is typically maintained in a released condition such that drive torque is only delivered to the rear wheels. However, when the sensors detect a low traction condition, the mode clutch actuator is actuated to engage the multi-plate mode clutch assembly for transmitting drive torque "on-demand" to the front wheels for establishing an adaptive four-wheel drive (AUTO-4WD) mode. The amount of drive torque transferred through the multi-plate mode clutch assembly to the front wheels can be varied as a function of specific vehicle dynamics and operating characteristics, as detected by the sensor arrangement.

A majority of current transfer cases are configured to include a rear output shaft interconnecting the transmission output to the rear driveline, a front output shaft interconnected to the front driveline, a transfer mechanism which is driven by the front output shaft, and a mode clutch assembly which is operably arranged to couple the transfer mechanism to the rear output shaft for transmitting drive torque to the front driveline. Typically, the transfer mechanism includes a first sprocket rotatably supported on the rear output shaft, a second sprocket fixed to the front output shaft, and a power chain encircling and drivingly interconnecting the first sprocket for common rotation with the front output shaft. The mode clutch assembly and components of the mode clutch actuator are typically disposed to surround the rear output shaft and function to couple the first sprocket to the rear output shaft. Examples of on-demand or "active" transfer cases are disclosed in U.S. Pat. Nos. 8,091,451; 8,316,738; and 8,678,158.

To accommodate differing road surfaces and/or vehicle load conditions, some transfer cases are also equipped with a range shift mechanism configured to permit the vehicle operator to further select between a four-wheel high-range drive (4WD-H) mode, a Neutral (N) mode, and a four-wheel low-range drive (4WD-L) mode. Typically, the range shift mechanism includes a gear reduction unit and a range clutch assembly having a range shift member that is moveable relative to the gear reduction unit to establish a direct ratio (i.e., the high-range) drive connection and a reduced ratio (i.e., the low-range) drive connection between the transmission output and the rear output shaft. In many "two-speed" transfer cases, the gear reduction unit is a planetary gearset and the moveable shift member of the range clutch is a sliding range sleeve configured to engage different components of the planetary gearset when moved between a high (H) range position for establishing the direct ratio drive connection and a low (L) range position for establishing the reduced ratio drive connection. The range shift mechanism also includes a range clutch actuator configured to control movement of the range sleeve, in coordination with actuation of the mode shift mechanism, to establish a selected one of the available drive modes which can include, for example, a two-wheel high-range (2H) drive mode, an adaptive four-wheel high-range (AUTO-4H) drive mode, a part-time four-wheel high-range (LOCK-4H) drive mode, the Neutral mode, and a part-time four-wheel low-range (LOCK-4L) drive mode.

One type of range clutch actuator used in two-speed transfer cases employs a rotary sector plate that is configured to convert rotary movement into linear translational movement of a range fork unit which, in turn, translates the range sleeve between its H, N, and L range positions. For example, U.S. Pat. Nos. 4,704,917, 4,770,280 and 5,159,847 each disclose a two-speed transfer case equipped with a rotary sector plate as part of the range clutch actuator. These U.S. patents further disclose use of the sector plate as part of the mode clutch actuator associated with the mode shift mechanism to provide coordinate range and mode shifts. Further versions of a sector-type range clutch actuator used in two-speed transfer cases are shown in U.S. Pat. No. 5,713,243 and U.S. Publication No. US2013/0263684. The two-speed transfer case disclosed in these references is equipped with a contact-type position sensor that is configured to directly engage a contoured surface of the sector plate, thereby providing a sensor signal to the transfer case controller unit that is indicative of the rotated position of the sector plate and, in turn, the particular drive mode established thereby. Typically, a ball switch is used as the contact-type position sensor in two-speed transfer cases.

As an alternative to contact-type position sensors, some two-speed transfer cases are equipped with non-contact or "contactless" position sensors as part of the range and/or mode shift systems. Specifically, U.S. Pat. No. 6,230,577 discloses a two-speed transfer case having a Hall Effect sensor integrated into the electric motor of the range clutch actuator for detecting the rotated position of a shift rail. U.S. Pat. No. 5,867,092 discloses a two-speed transfer case with a Hall Effect sensor arranged to detect the position of an axially-moveable shift rail used to move the range sleeve. Other non-contact position sensing systems used in the shift system of vehicular gearboxes are shown in U.S. Pat. Nos. 5,625,289 and 8,258,779.

While the use of non-contact position sensors has been considered for use in transfer cases, a need exists to develop alternative contactless position sensing configurations which advance the technology and provide improved function and reliability without increasing the packaging space requirements and/or the number of required components.

SUMMARY

This section provides a general summary of the disclosure and is not intended to be interpreted as a complete and comprehensive disclosure of all of its features, advantages, objectives and aspects.

It is an aspect of the present disclosure to provide a two-speed transfer case for use in four-wheel drive vehicles that includes a range shift mechanism equipped with a noncontact position sensor for detecting the position of a moveable range shift component.

It is a related aspect of the present disclosure to provide the noncontact position sensor in association with a rotary sector plate so as to detect the rotated position of the sector plate.

It is another related aspect of the present disclosure to provide the noncontact position sensor in association with an axially moveable component so as to detect the axial position of the axially moveable component. The axially moveable component may include a range fork unit configured to axially move a range sleeve associated with the range clutch of the two-speed range mechanism. The axially moveable component may alternatively include a range shift rail configured to move axially.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations such that they are not intended to limit the scope of the present disclosure.

DETAILED DESCRIPTION

Figure 1:
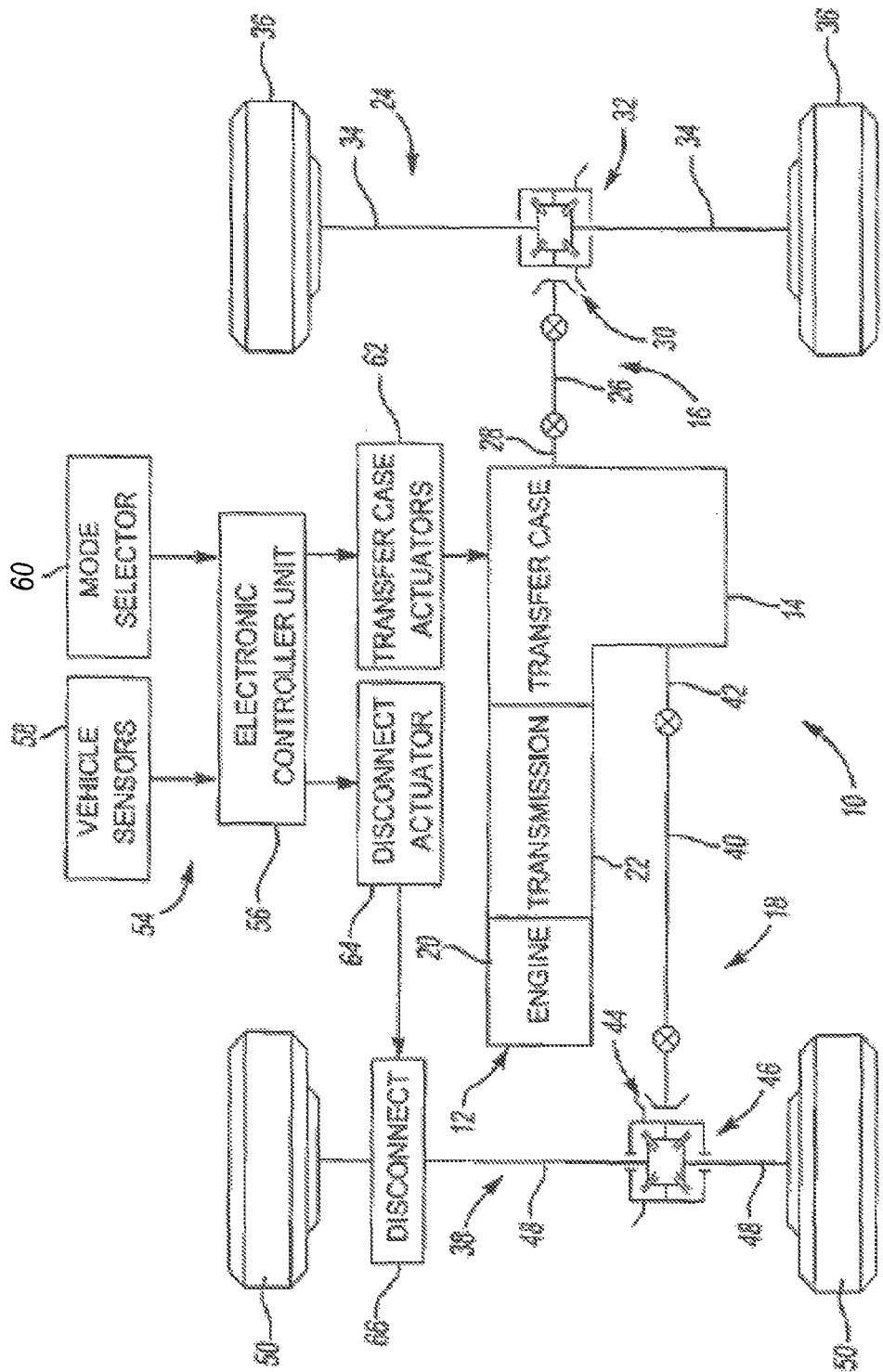
FIG. 1 is a schematic illustration of a four-wheel drive motor vehicle equipped with a power transfer system having a two-speed transfer case constructed in accordance with the teachings of the present disclosure.

Example embodiments will now be described more fully with reference to the accompanying drawings. In particular, at least one example embodiment of a two-speed transfer case adapted for use with four-wheel drive vehicles and having a noncontact positioning sensing arrangement is provided so that this disclosure will be thorough and will fully convey the true and intended scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps operations, elements, components, and/or groups or combinations thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring initially to FIG. 1 of the drawings, an example drivetrain for a four-wheel drive motor vehicle 10 is shown to include a powertrain 12 operable to generate rotary power (i.e., drive torque) which is transmitted through a power transfer unit, hereinafter transfer case 14, to a first or primary driveline 16 and to a second or secondary driveline 18. Powertrain 12 is shown, in this non-limiting example, to include a power source such as an internal combustion engine 20, and a transmission 22. In the particular arrangement shown, primary driveline 16 is a rear driveline and generally includes a rear axle assembly 24 and a rear propshaft 26 arranged to drivingly interconnect a rear output shaft 28 of transfer case 14 to an input of rear axle assembly 24. The input to rear axle assembly 24 includes a hypoid gearset 30 connected to rear propshaft 26. Rear axle assembly 24 includes a rear differential assembly 32 driven by hypoid gearset 30, and a pair of rear axleshafts 34 interconnecting rear differential assembly 32 to a pair of ground-engaging rear wheels 36. Secondary driveline 18 is a front driveline and includes a front axle assembly 38 and a front propshaft 40 arranged to drivingly interconnect a front output shaft 42 of transfer case 14 to an input of front axle assembly 38. The input to front axle assembly 38 includes a hypoid gearset 44 connected to front propshaft 40. Front axle assembly 38 includes a front differential assembly 46 driven by hypoid gearset 44, and a pair of front axleshafts 48 interconnecting front differential assembly 46 to a pair of ground-engaging front wheels 50.

Motor vehicle 10 is also shown in FIG. 1 to include a traction control system 54 having an electronic controller unit 56 configured to receive input signals from vehicle sensors 58 and a mode selector 60 and to subsequently provide control signals to various actuators. In the non-limiting example shown, controller unit 56 provides control signals to one or more power-operated transfer case actuators 62 and an axle disconnect actuator 64. As will be detailed with greater specificity, transfer case actuators 62 may include a range clutch actuator associated with a two-speed range mechanism to provide high-range and low-range drive connections, and a mode clutch actuator associated with a mode mechanism to provide two-wheel drive and four-wheel drive modes of operation. Disconnect actuator 64 controls operation of a disconnect device 66 associated with front axle assembly 38 for selectively coupling and uncoupling front driveline 18 relative to transfer case 14. Sensors 58 are configured to provide information to controller unit 56 indicative of the current operational characteristics of vehicle 10 as well as road conditions for use in controlling operation of transfer case 14. The information provided by sensors 58 may include, without limitations, information related to vehicle speed, driveline/wheel speeds, acceleration, braking status, steering angle, throttle position, lateral displacement, and/or rain sensors. Mode selector 60 permits a vehicle operator to select operation of vehicle 10 in one of the available drive modes which may include, without limitation, a two-wheel high-range (2WH) drive mode, an automatic four-wheel high-range (AUTO-4WH) drive mode, a locked four-wheel high-range (LOCK-4WH) drive mode, and a locked four-wheel low-range (LOCK-4WL) drive mode. Mode selector 60 is located within the passenger compartment of vehicle 10 and includes a gear-shift lever or switches that can be actuated by the vehicle operator to select the desired mode of operation.

Figure 2:
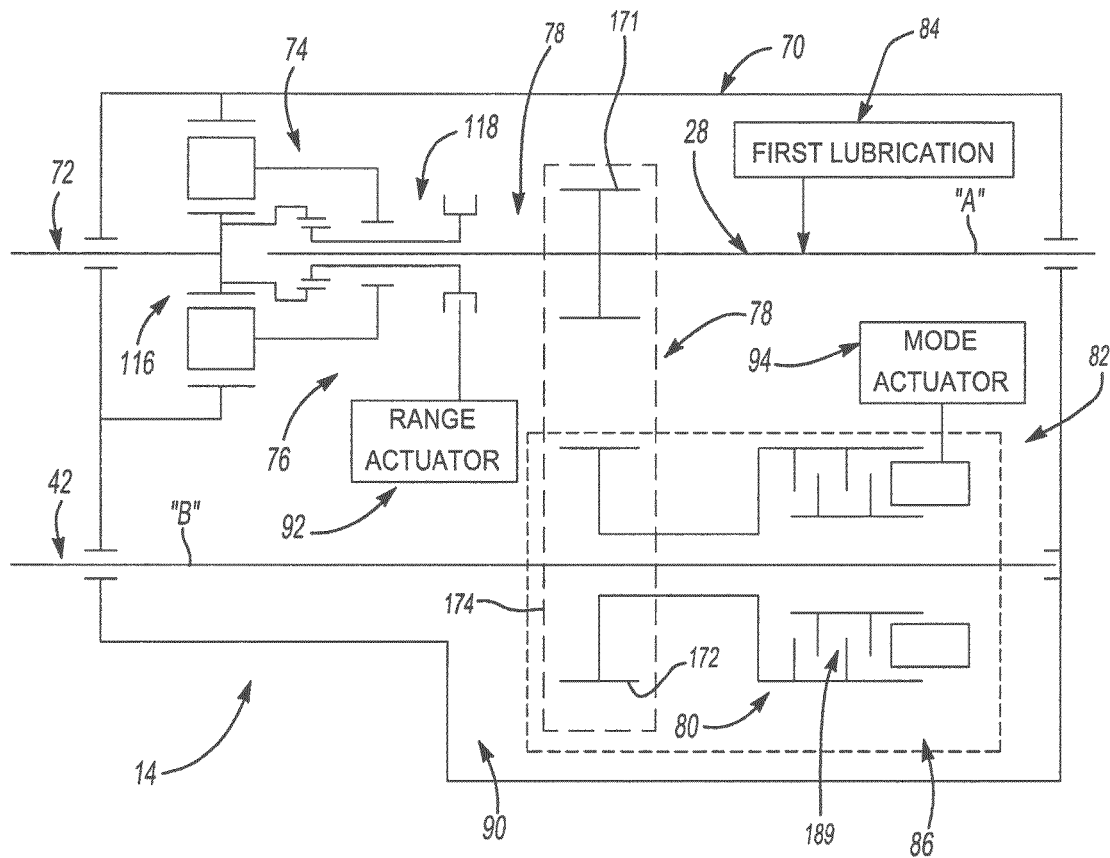
FIG. 2 is a diagrammatical illustration of an active two-speed transfer case embodying the teachings of the present disclosure.

Referring now to FIG. 2 of the drawings, a stick diagram of an example embodiment of transfer case 14 constructed in accordance with the teachings of the present disclosure is provided. Transfer case 14 is generally shown to include: a housing assembly 70; an input shaft 72 rotatably supported by housing assembly 70; a two-speed range mechanism 74 disposed between input shaft 72 and rear output shaft 28; a range shift mechanism 76 controlling operation of range mechanism 74; a transfer mechanism 78 driven by rear output shaft 28; a mode mechanism 80 disposed between transfer mechanism 78 and front output shaft 42; a mode shift mechanism 82 controlling operation of mode mechanism 80; a first lubrication mechanism 84 associated with rear output shaft 28; and a second lubrication mechanism 86 (shown in phantom lines) associated with front output shaft 42. As is evident, range mechanism 74 is arranged in association with a first rotary axis "A" of transfer case 14 while mode mechanism 80 is arranged in association with a second rotary axis "B" of transfer case 14. With transfer case 14 installed in vehicle 10, the first axis is generally parallel but offset above the second axis with housing assembly 70 configured to define a sump area 90 filled with a lubricating oil in an area generally configured to locate at least a portion of mode mechanism 80 within sump area 90. Transfer case 14 is also shown in FIG. 2 to include a range clutch actuator 92 in association with range shift mechanism 76 and a mode clutch actuator 94 in association with mode shift mechanism 80.

Figure 3:
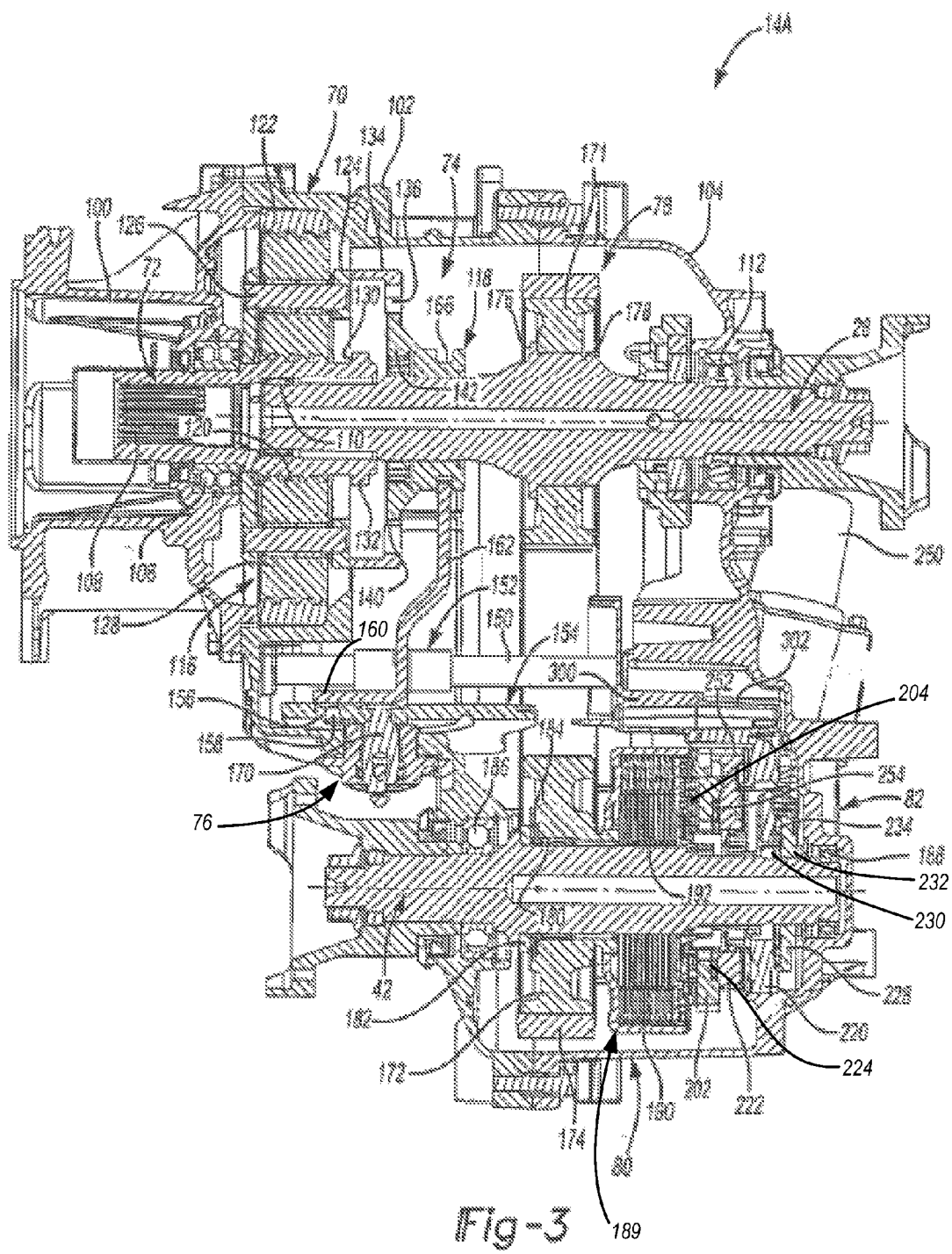
FIG. 3 is a sectional view of an active two-speed transfer case constructed in accordance with a first embodiment of the present disclosure.

With particular reference now to FIG. 3, an embodiment of transfer case 14 originally shown in FIGS. 1 and 2, is shown in cross-section and identified by reference numeral 14A. Housing assembly 70 is shown, in this non-limiting example, to include a multi-piece configuration having an adapter housing section 100, a front housing section 102, and a rear housing section 104. Adapter housing section 100 is configured to be rigidly secured to transmission 22 and includes a bearing assembly 106 rotatably supporting input shaft 72. Input shaft 72 includes internal splines 108 adapted to matingly engage with external splines of a transmission output shaft. Rear output shaft 28 is supported for rotation relative to input shaft 72 by a first bearing assembly 110 disposed between input shaft 72 and rear output shaft 28, and a second bearing assembly 112 disposed between rear housing section 104 and rear output shaft 28.

Range mechanism 74 is shown, in this non-limiting embodiment, to include a planetary gearset 116 and a range clutch 118. Planetary gearset 116 includes a sun gear 120 fixed to or formed integrally with input shaft 72, a ring gear 122 non-rotatably fixed to front housing section 102, a carrier unit 124 having a plurality of pins 126, and a plurality of planet gears 128 each rotatably mounted on a corresponding one of pins 126 and in constant meshed engagement with sun gear 120 and ring gear 122. Input shaft 72 includes a clutch ring segment 130 having external clutch teeth 132 formed thereon. Carrier unit 124 includes a clutch ring segment 134 having internal clutch teeth 136 formed thereon. Range clutch 118 is a sliding range sleeve or collar that is splined for common rotation with rear output shaft 28. Range collar 118 also includes external clutch teeth 140 and internal clutch teeth 142. Range collar 118 is axially moveable on rear output shaft 28 between three (3) distinct range positions.

Range collar 118 is moveable between a high-range (H) position, a neutral (N) position, and a low-range (L) position. When range collar 118 is located in its H range position, its internal clutch teeth 142 engage external clutch teeth 132 on input shaft 72 so as to establish a first or "direct" (i.e., high-range) speed ratio drive connection between input shaft 72 and rear output shaft 28. In contrast, when range collar 118 is located in its L range position, its external clutch teeth 140 engage internal clutch teeth 136 on carrier unit 124 so as to establish a second or "reduced" (i.e., low-range) speed ratio drive connection between input shaft 72 and rear output shaft 28. Location of range collar 118 in its N position disengages rear output shaft 28 from driven connection with input shaft 72 and carrier unit 124 so as to permit relative rotation therebetween. Accordingly, the high-range connection is established when range collar 118 is located in its H range position and the low-range connection is established when range collar 118 is located in its L range position. The two-speed range mechanism shown and described is intended to exemplify any suitable gear reduction device capable of establishing two distinct speed ratio drive connections between input shaft 72 and rear output shaft 28.

Range shift mechanism 76 is shown, in the non-limiting embodiment, to include a shift rail 150 mounted between front and rear housing sections 102, 104 of housing assembly 70, a range fork unit 152 slideably disposed on shift rail 150, and a rotary sector plate 154 having a contoured range slot 156 within which a range pin 158 extends. Range pin 158 extends outwardly from a tubular hub segment 160 of range fork unit 152 such that rotation of sector plate 154 is converted into linear translational movement of range fork unit 152 based on range pin 158 moving within range slot 156. Range fork unit 152 further includes a fork segment 162 extending outwardly from hub segment 160 and having a pair of bifurcated forks that are retained in an annular groove 166 formed in range collar 118. Therefore, axial movement of range fork unit 152 results in sliding movement of range collar 118 between its three distinct range positions. While not specifically shown, range clutch actuator 92 may include an electric motor for rotatably driving a sector shaft 170 that is, in turn, coupled to sector plate 154 for rotating sector plate 154 so as to locate range collar 118 in the desired range position. As an alternative, range clutch actuator 92 may include a mechanically-operated linkage mechanism interconnecting sector shaft 170 to a manually-operated gearshift lever in the passenger compartment of vehicle 10. Those skilled in the art will appreciate that any suitable arrangement capable of axially moving range fork unit 152 to facilitate movement of range collar 118 between its three (3) distinct range positions, whether via power-operated actuation or manual actuation, is within the meaning of range clutch actuator 92.

Transfer mechanism 78 is shown in the non-limiting example, to include a first transfer component driven by rear output shaft 28 and which is arranged to transfer drive torque to a second transfer component rotatably supported on front output shaft 42. Transfer mechanism 78 is a chain and sprocket type of drive assembly including a first sprocket 171 acting as the first transfer component, a second sprocket 172 acting as the second transfer component, and an endless power chain 174 encircling first sprocket 171 and second sprocket 172. First sprocket 171 is splined for common rotation with rear output shaft 28 and is axially retained between a radial flange 176 and a snap-ring 178. Second sprocket 172 is rotatably mounted on front output shaft 42 via a needle bearing assembly 180. A retainer ring 182 and a radial thrust bearing assembly 184 are also disposed between second sprocket 172 and front output shaft 42. Front output shaft 42 is rotatably supported by housing assembly 70 via a pair of laterally-spaced roller bearing units 186 and 188. It is contemplated that alternative transfer mechanisms, such as gear drive arrangements, can be used with transfer case 14A to transfer drive torque from rear output shaft 28 to a transfer component rotatably supported on front output shaft 42.

Mode mechanism 80 is shown, in this non-limiting example, to include a wet-type multi-plate mode clutch 189 disposed between second sprocket 172 and front output shaft 42 for facilitating adaptive torque transfer therebetween. Mode clutch 189 generally includes a first clutch member or clutch drum 190 fixed for common rotation with second sprocket 172, a second clutch member or clutch hub 192 formed integrally with an intermediate section of front output shaft 42, and a multi-plate clutch pack comprised of alternatively interleaved inner and outer clutch plates. The outer clutch plates are splined for rotation with clutch drum

190 while the inner clutch plates are splined for rotation with clutch hub 192. Mode clutch 189 also includes an axially-moveable apply plate 202, and a plurality of circumferentially aligned return springs 204 disposed between clutch drum 190 and apply plate 202. As will be detailed, return springs 204 are configured and arranged to normally bias apply plate 202 in a direction toward a retracted position relative to the clutch pack. Apply plate 202 includes a plurality of axially-extending and circumferentially-aligned drive lugs configured to engage and apply a clutch engagement force on the clutch pack, the magnitude of which controls the amount of drive torque that is transferred from clutch drum 190 to clutch hub 192 through the clutch pack. While mode mechanism 80 is shown configured to include a multi-plate wet-type mode clutch, those skilled in the art will recognize that such a mode mechanism is intended to represent any type of mode clutch or coupling capable of selectively coupling front output shaft 42 for rotation with second sprocket 172 of transfer mechanism 78 for facilitating the transfer of drive torque to front driveline 18.

Mode shift mechanism 82 is shown, in this non-limiting example, to include a motor-driven rotary-to-linear conversion device of the type commonly referred to as a ballramp unit. The ballramp unit generally includes a first cam ring 220, a second cam ring 222, and followers 224 disposed in aligned cam tracks formed therebetween. First cam ring 220 is non-rotatably fixed to housing assembly 70. First cam ring 220 is also fixed axially against a backing plate 228 via a shim ring 230 and a snap ring 232. Backing plate 228 is splined for rotation with front output shaft 42 such that a radial thrust bearing unit 234 is disposed between first cam ring 220 and backing plate 228. First cam ring 220 has a plurality of circumferentially-aligned first cam tracks which followers 224 engage. Second cam ring 222 includes a matching plurality of second cam tracks against which followers 224 also rollingly engage. A pair of cage plates retain and align followers 224 relative to the first cam tracks and the second cam tracks. Second cam ring 222 is adapted to move axially relative to first cam ring 220 as a result of rotation of second cam ring 222 relative to first cam ring 220. As such, the profile and/or contour of the first and second cam tracks controls the linear motion of second cam ring 222. An electric motor 250 acts as mode clutch actuator 94 and has a rotary output driving a worm (not shown) that is meshed with geared rack segment 252 of second cam ring 222. As will be understood, the direction and amount of rotation of the electric motor's output controls the direction and amount of rotation of second cam ring 222 which, in turn, controls the direction and amount of axial travel of second cam ring 222 relative to the clutch pack. A thrust bearing assembly 254 is disposed between a face surface of second cam ring 222 and a face surface of apply plate 202 to accommodate rotation of apply plate 202 relative to second cam ring 222 during coordinated axial movement of apply plate 202 with second cam ring 222.

Second cam ring 202 is configured to control axial movement of apply plate 202 between a first or minimum clutch engagement position and a second or maximum clutch engagement position relative to the clutch pack of mode clutch 189. With apply plate 202 axially located in its first position, a predetermined minimum clutch engagement force is exerted by the drive lugs on the clutch pack, thereby transferring a minimum amount of drive torque from rear output shaft 28 (through transfer mechanism 78) to front output shaft 42. Typically, no drive torque is transmitted from rear output shaft 28 and transfer mechanism 78 through mode clutch 189 when apply plate 202 is located in its first position, thereby establishing a "released" mode for mode clutch 189 and a two-wheel drive mode (2WD) for transfer case 14A. In contrast, with apply plate 202 axially located in its second position, a predetermined maximum clutch engagement force is exerted by the drive lugs on the clutch pack, thereby transferring a maximum amount of drive torque through mode clutch 189 to front output shaft 42. In this position, a "fully engaged" mode is established for mode clutch 189 and a locked four-wheel drive mode (LOCK-4WD) is established for transfer case 14A. Precise control over the axial location of apply plate 202 between its first and second positions permits adaptive torque transfer from rear output shaft 28 to front output shaft 42 so as to establish an adaptive or on-demand four-wheel drive (AUTO-4WD) mode for transfer case 14A. Return springs 204 react against apply plate 202 so as to normally bias apply plate 202 toward its first position. Those skilled in the art will recognize that mode shift mechanism 82 can be any suitable power-operated arrangement operable for controlling movement of apply plate 202 relative to the clutch pack. Those skilled in the art will also recognize that mode clutch 189 and mode clutch actuator 94 could be associated with the first rotary axis so as to surround rear output shaft 28 and be operable to couple first sprocket 171 to rear output shaft 28 so as to transfer drive torque to front output shaft 42 via transfer mechanism 78. In such an arrangement, first sprocket 171 is rotatably supported on rear output shaft 28 while second sprocket 172 is fixedly connected to front output shaft 42.

Figure 4:
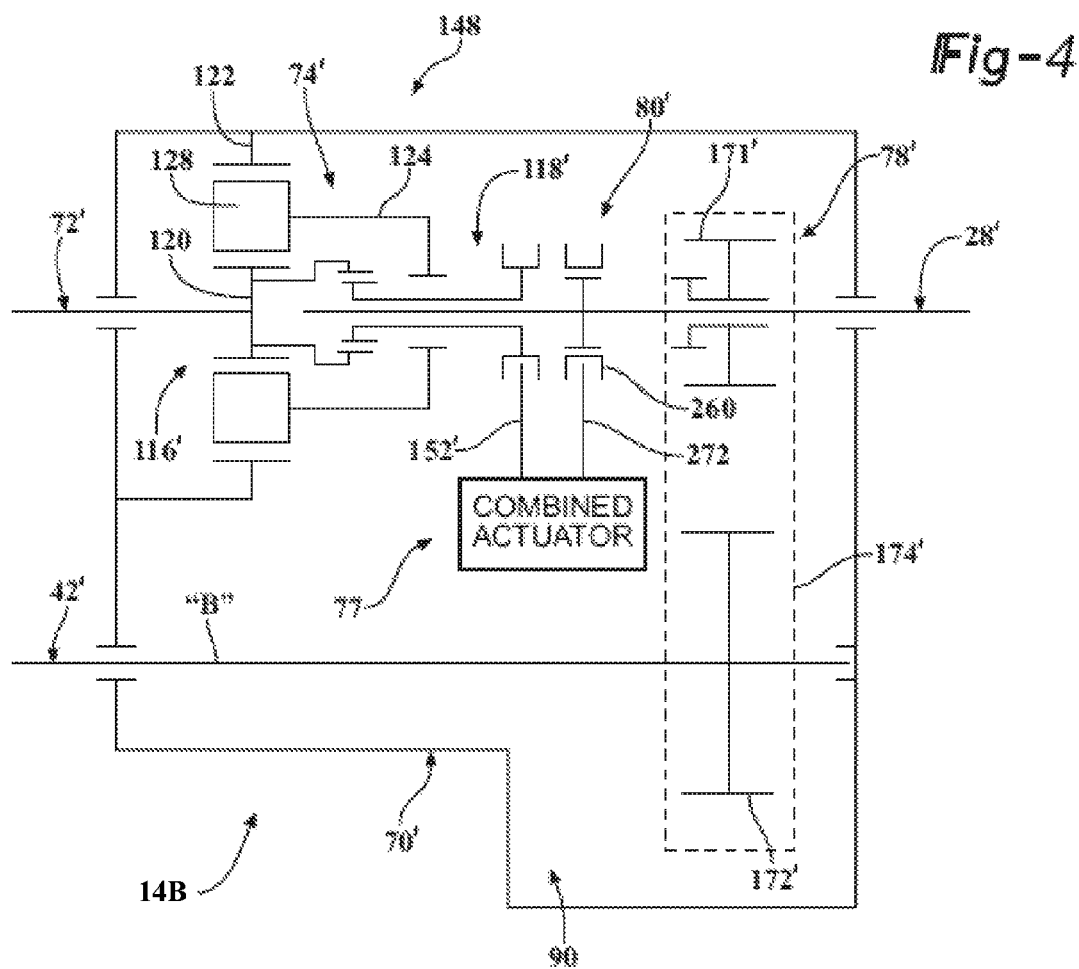
FIG. 4 is a diagrammatical illustration of a part-time two-speed transfer case embodying the teachings of the present disclosure.
Figure 5:
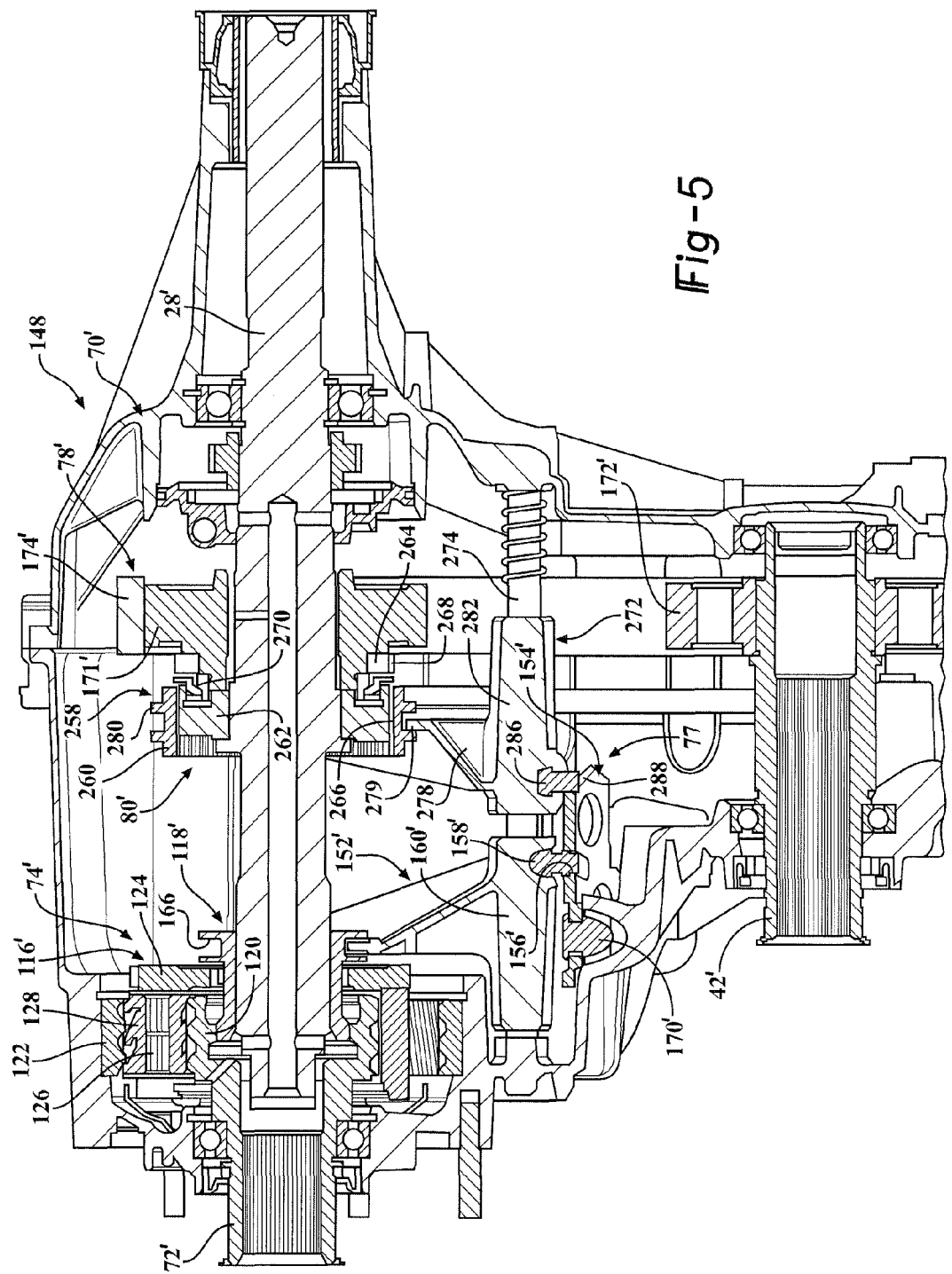
FIG. 5 is a sectional view of a part-time two-speed transfer case constructed in accordance with a second embodiment of the present disclosure.
Figure 6:
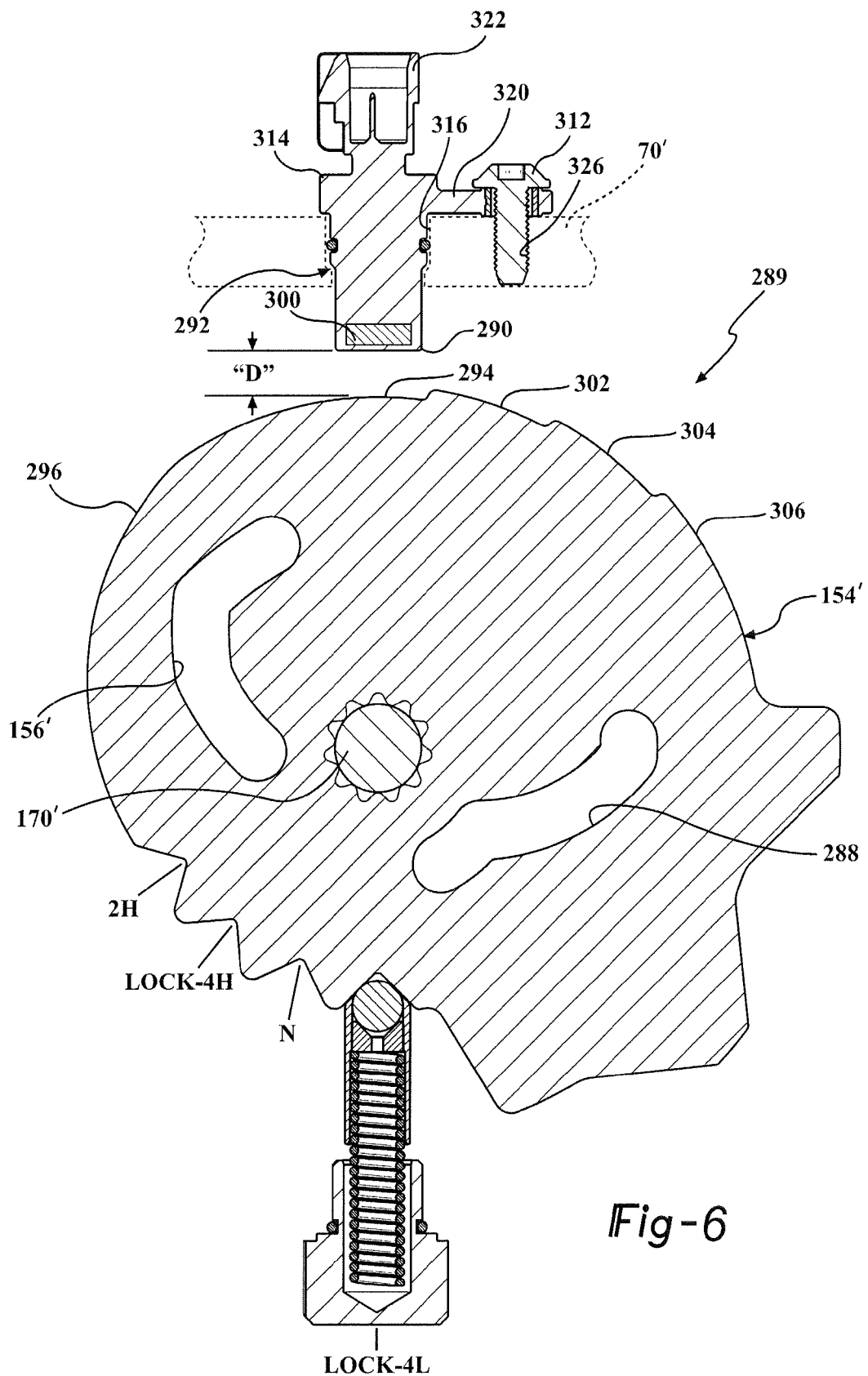
FIG. 6 is a sectional view illustrating a noncontact position sensing arrangement associated with the range clutch actuator shown in FIGS. 4 and 5.

Referring now to FIGS. 4 through 6, a second embodiment of transfer case 14, identified by reference numeral 14B, is shown, both diagrammatically and in cross-section, as a part-time two-speed transfer case. Transfer case 14B differs from active two-speed transfer case 14A in that mode mechanism 80' is now associated with the first rotary axis and a mode clutch 258 is configured as a mechanically-actuated, positive-locking (i.e., dog-type) clutch assembly. Additionally, the range shift mechanism and the mode shift mechanism are now integrated into a common range/mode shift mechanism 77. Specifically, FIG. 4 is a stick diagram of transfer case 14B which is generally shown to include: a housing assembly 70'; an input shaft 72'; a two-speed range mechanism 74'; a transfer mechanism 78' driven by front output shaft 42'; a mode mechanism 80' disposed between transfer mechanism 78' and rear output shaft 28'; and a range/mode or "combined" shift mechanism 77 controlling coordinated actuation of range mechanism 74' and mode mechanism 80'.

With continued reference to FIGS. 4 and 5, range mechanism 74' is shown to include planetary gearset 116' and range clutch 118' which are generally similar in structure and function to those components previously described in FIG. 3. In view of the commonality, like components are identified with common reference numerals and no further description is required. Range collar 118' is splined to rear output shaft 28' and is moveable thereon between its three (3) distinct range positions. As before, range collar 118' is operable in its high (H) range position to drivingly connect input shaft 72' (or sun gear 120) directly to rear output shaft 28' while it is operable in its low (L) range position to drivingly connect planet carrier 124 of planetary gearset 116' to rear output shaft 28'. Transfer mechanism 78' is shown, in this non-limiting example, to include a first sprocket 171' rotatably supported on rear output shaft 28', a second sprocket 172' fixed for common rotation with front output shaft 42', and a power chain 174' therebetween.

Mode mechanism 80' is shown to include a mode clutch 258 having a mode collar 260 splined for rotation with and sliding axial movement on a clutch hub 260 that is, in turn, fixed for rotation with rear output shaft 28. Mode clutch 258 also includes a clutch ring 264 fixed to sprocket 171'. Mode collar 260 is movable between a first or two-wheel drive (2WD) mode position and a second or four-wheel drive (4WD) mode position. In its 2WD mode position, internal clutch teeth 266 on mode collar 260 are disengaged from meshed connection with external clutch teeth 268 on clutch ring 264 such that transfer mechanism 78' is disconnected from rear output shaft 28'. In contrast, movement of mode collar 260 to its 4WD mode position results in a driving connection being established between sprocket 171' and rear output shaft 28'. A synchronizer 270 may be provided for permitting "on-the-move" mode shifting into and out of the 4WD mode.

Combined shift mechanism 77 is shown, in this non-limiting example, to include a range fork unit 152' configured to move range collar 118' and a mode fork unit 272 configured to move mode collar 260. In particular, FIG. 5 illustrates combined shift mechanism 77 to also include a shift rail 274 mounted in housing assembly 70', range fork unit 152' slideably disposed on shift rail 274, mode fork unit 272 slideably disposed on shift rail 274, and a rotary sector plate 154'. Sector plate 154' includes a contoured range slot 156' within which a range pin 158' extends. Range pin 158' extends outwardly from a tubular segment 160' of range fork unit 152' such that rotation of sector plate 154' is converted into linear translation of range fork unit 152' based on range pin 158' moving within range slot 156'. As previously disclosed, such axial translation of range fork unit 152' results in concurrent axial translation of range collar 118' between its three distinct range positions. Mode fork unit 272 includes a mode fork 278 having bifurcated ends 279 engaging a groove 280 formed in mode collar 260, a tubular segment 282 slideably mounted on shaft rail 274, and a mode pin 286 retained with a contoured mode slot or a contoured edge surface 288 formed in sector plate 154'. The contoured profile of mode slot/edge surface 288 causes axial movement of mode fork unit 272 in response to rotation of sector plate 154'. Additionally, the contour of mode slot/edge surface 288 and the contour of range slot 156' are cooperatively configured to locate range collar 118' and mode collar 260 in their proper range and mode positions to establish each of the 2WH, the LOCK-4H, the N, and the LOCK-4L drive modes. Sector plate 154' is fixed to a sector shaft 170'. While not specifically shown, sector shaft 170' is rotated to move sector plate 170' to the desired rotated position via either a manually-operated linkage system or an electromechanical system having an electric motor controlling rotation of sector shaft 170'.

Referring now to FIG. 6, a non-contact or "contactless" position sensing arrangement 289 is shown that is adapted for use with transfer case 14B of FIGS. 4 and 5, as well as for use with transfer case 14A of FIG. 3. In particular, sector plate 154' is shown rotated to a first sector position, identified by the reference line "LOCK-4L", which is indicative of the rotated position of sector plate 154' required to establish the locked four-wheel low-range drive mode of transfer case 14B. In this first sector position, an end surface 290 of a non-contact position sensor 292, such as a Hall effect sensor, is a predetermined first distance "$D_1$" from a first sector tracking surface 294 formed on an edge 296 of sector plate 154'. Hall effect sensor 292 is functional to measure the magnetic flux developed between a magnet 300 located in end surface 290 of sensor 292 and a ferrous component, namely sector plate 154'. Position sensor 292 is operable to generate a variable output signal as a result of sensing the rotational position of the ferrous sector plate 154', particularly since the edge profile of sector plate 154' defines four (4) distinct sector tracking surfaces, each being assigned to a corresponding sector position.

Rotation of sector plate in a first direction (CCW in FIG. 6) from its first sector position into a second sector position, identified by reference line "N" is indicative of the rotated position of sector plate 154' required to establish the Neutral mode. In this second sector position, end surface 290 of position sensor 292 is displaced a predetermined second distance "$D_2$" from a second sector tracking surface 302 formed on edge 296 of sector plate 154'. It should be noted that second sector tracking surface 302 is stepped radially outwardly relative to first sector tracking surface 294. Therefore, the second distance $D_2$ is less than the first distance $D_1$.

Continued rotation of sector plate 154' in this first direction from its second sector tracking position into a third sector position, identified by reference line "LOCK-4H", is indicative of the rotated position of sector plate 154' required to establish the locked four-wheel high-range drive mode. With sector plate 154' rotated into its third sector position, end surface 290 of position sensor 292 is displaced a predetermined third distance $D_3$ from a third sector tracking surface 304 formed on edge 296 of sector plate 154'. It is again noted that third sector tracking surface 304 is stepped radially outwardly from second sector tracking surface 302. As such, third distance $D_3$ is less than second distance $D_2$.

Continued rotation of sector plate 154' in the first rotary direction from its third sector position into a fourth sector position, identified by reference line "2H", is indicative of the rotated position of sector plate 154' required to establish the two-wheel high-range drive mode. With sector plate 154' in its fourth sector position, end surface 290 of position sensor 292 is located a predetermined fourth distances "$D_4$" from a fourth sector tracking surface 306 formed on edge 296 of sector plate 154'. As seen, fourth sector tracking surface 306 is stepped radially outwardly from third sector tracking surface 304. Therefore, the fourth distance $D_4$ is less than the third distance $D_3$. Thus, the stepped edge profile of edge surface 296 on sector plate 154' establish four (4) distinct target distances ($D_1$-$D_4$) between position sensor 292 and sector plate 154' generated different magnetic flux levels and permitting the rotated position of sector plate 154' to be detected and signaled to the transfer case control system.

Figures 7, 8:
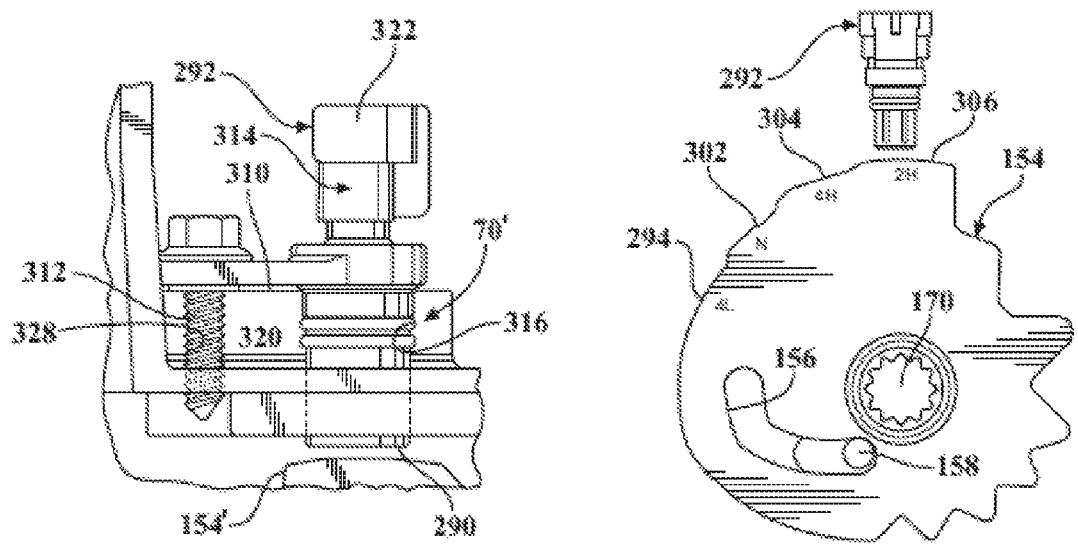
FIG. 7 is a view illustrating the mounting of a contactless position sensor relative to a housing of the two-speed transfer cases of the present disclosure.
FIG. 8 is a view, similar to FIG. 6, except showing the noncontact positioning sensing arrangement associated with a range clutch actuator used with the active two-speed transfer case of FIG. 3.

In one form, the duty cycle of the electric signal outputted from position sensor 292 is a function of the rotated position of sector plate 154' due to its staggered edge profile in relation to the stationary positioning of position sensor 292. In the example shown, position sensor 292 is mounted to an external surface 310 of housing assembly 70' via threaded fastener 312 with a case portion 314 of position sensor 292 extending through a throughbore 316 formed in housing 70' so as to align with sector plate 154'. FIG. 7 indicates that position sensor 292 includes case portion 314 being retained in throughbore 316 and also defining a mounting flange 320 and an electrical connector 322. Threaded fastener 312 extends through a mounting hole 326 in mounting flange 320 to securely fasten casing 314 to housing assembly 70' of transfer case 14B. In this arrangement, sensor 292 can be installed externally to transfer case 14A, 14B so as to permit easy assembly and replacement if required. In view of the above, a contactless sensor can be employed to detect its relationship to one of a plurality of tracking surfaces formed on a ferrous component of a rotary-to-linear conversion device so as to provide a signal indicative of the axial position of a sliding range (or mode) shift member.

Referring now to FIGS. 9 through 17, a transfer case according to a third embodiment of the present disclosure is disclosed. As will be further detailed, transfer case 400 is equipped with a torque transfer arrangement including a two-speed range mechanism 402, a mode mechanism 404, and a power-operated shift mechanism 406 that is operable to control coordinated shifting of range mechanism 402 and adaptive engagement of mode mechanism 404. In addition, control system 54 is again provided for controlling actuation of shift mechanism 406. Control system 54 includes vehicle sensors 58 for detecting real time operational characteristics of motor vehicle 10, mode selector 48 for permitting the vehicle operator to select one of the available drive modes, and transfer case controller unit 56 that is operable to generate electric control signals in response to input signals from sensors 58 and mode signals from mode selector 48.

Transfer case 400 is shown to include a rotary input member, such as an input shaft 408 that is adapted to be coupled for driven connection with the output shaft of transmission 22. Input shaft 408 is supported in a housing 410 by a bearing assembly 412 for rotation about a first rotary axis. A first rotary output, such as a mainshaft or rear output shaft 414 is supported between input shaft 408 and housing 410 for rotation about the first rotary axis via a pair of laterally-spaced bearing assemblies 416 and 418. In addition, a second rotary output, such as front output shaft 420, is supported in housing 410 for rotation about a second rotary axis by a pair of bearing assemblies 422 and 424.

Figure 9:
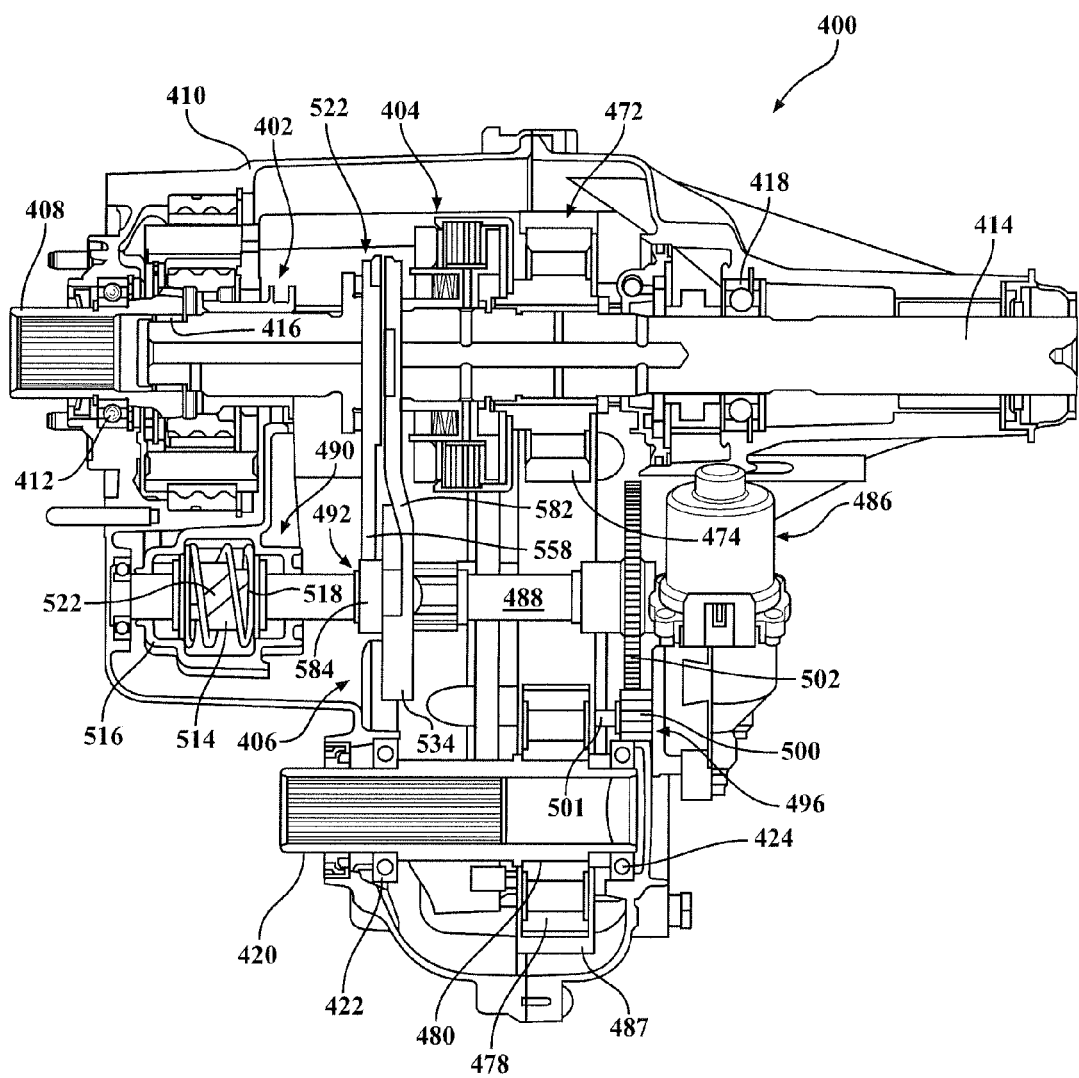
FIGS. 9 and 10 are sectional views of another active two-speed transfer case constructed in accordance with a third embodiment of the present disclosure.
Figure 10:
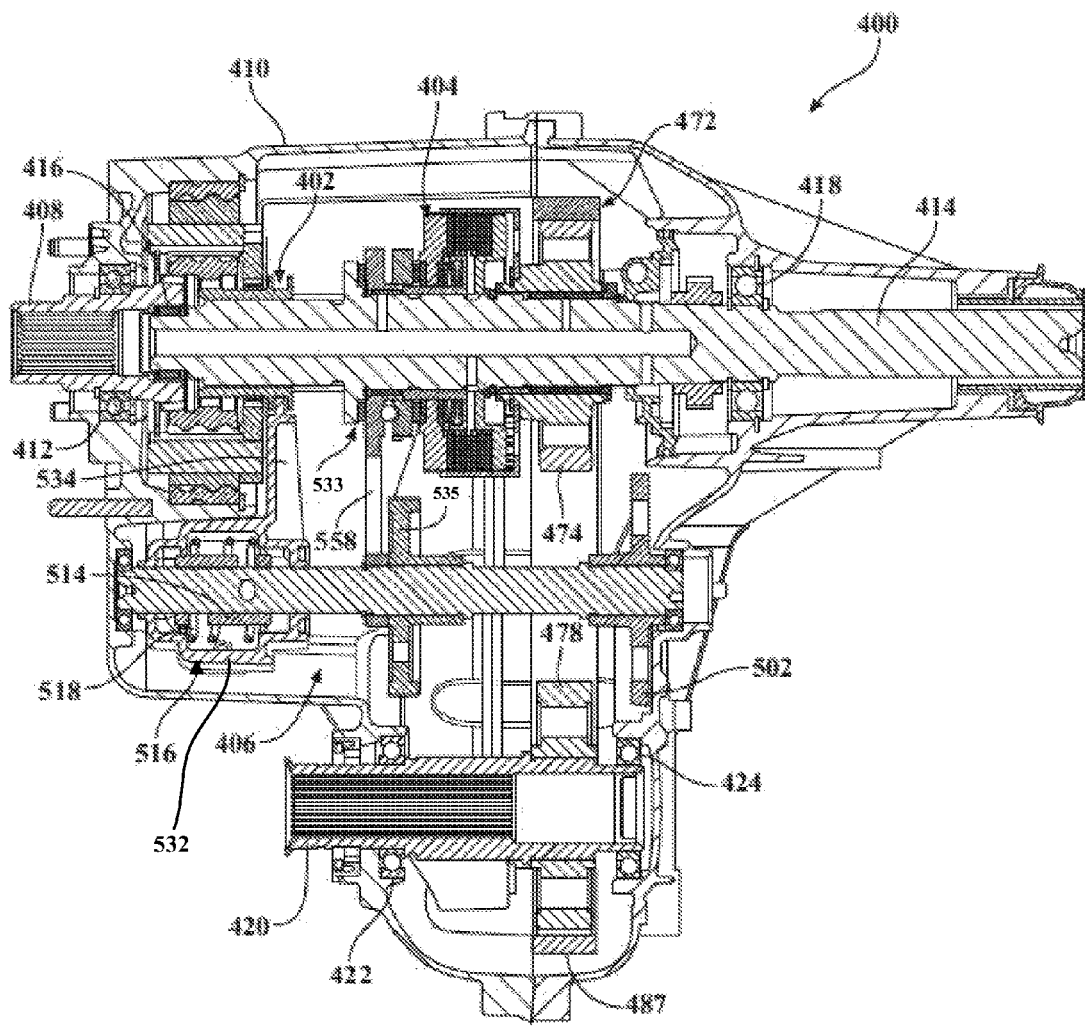
Figure 11:
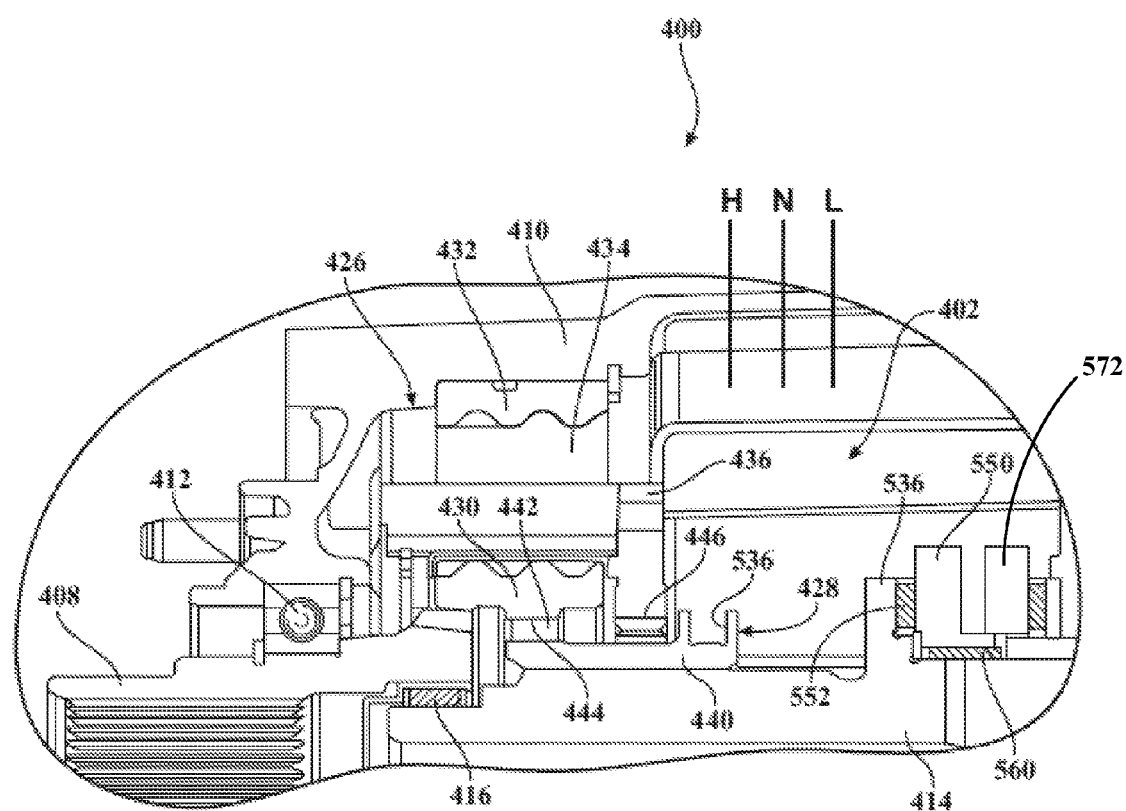
FIG. 11 is an enlarged partial view of various components associated with the range clutch used in the active two-speed transfer case shown in FIGS. 9 and 10.

As best seen from FIGS. 9 through 11, range mechanism 402 is shown to generally include a reduction gearset 426 and a range clutch 428. Reduction gearset is shown as a planetary gearset 426 having a sun gear 430 directly driven by input shaft 408, a ring gear 432 non-rotatably fixed to housing 410, and a plurality of planet gears 434 rotatably supported from a planet carrier 436. As seen, planet gears 434 are meshed with both sun gear 430 and ring gear 432. Planetary gearset 426 functions to drive planet carrier 436 at a reduced speed relative to input shaft 408.

Range clutch 428 includes a range collar 440 coupled via a splined connection for rotation with and axial sliding movement on rear output shaft 414. Range collar 440 has external clutch teeth 442 adapted to selectively engage either internal clutch teeth 444 formed on input shaft 408 or internal clutch teeth 446 formed on planet carrier 436. Range collar 440 is shown located in its high (HI) range position such that its clutch teeth 442 are engaged with clutch teeth 444 on input shaft 408. As such, the direct speed ratio or "high-range" drive connection is established between input shaft 408 and rear output shaft 414. Range collar 440 is axially moveable on rear output shaft 414 from its (H) range position through its central neutral (N) range position into its low (L) range position. Location of range collar 440 in its (N) range position functions to disengage its clutch teeth 442 from both input shaft clutch teeth 444 and carrier clutch teeth 446, thereby uncoupling rear output shaft 414 from driven connection with input shaft 408. In contrast, movement of range collar 440 into its (L) range position causes its clutch teeth 442 to engage clutch teeth 446 on planet carrier 436, thereby establishing the reduced speed ratio or "low-range" drive connection between input shaft 408 and rear output shaft 414. It will be appreciated that planetary gearset 426 and range clutch 402 function to provide transfer case 400 with a two-speed (i.e., high-range and low-range) feature. Furthermore, any two-speed reduction gearset associated with a moveable range shift member to establish first and second ratio driven connections between input shaft 408 and rear output shaft 414 is considered to be within the scope of this invention.

Figure 12:
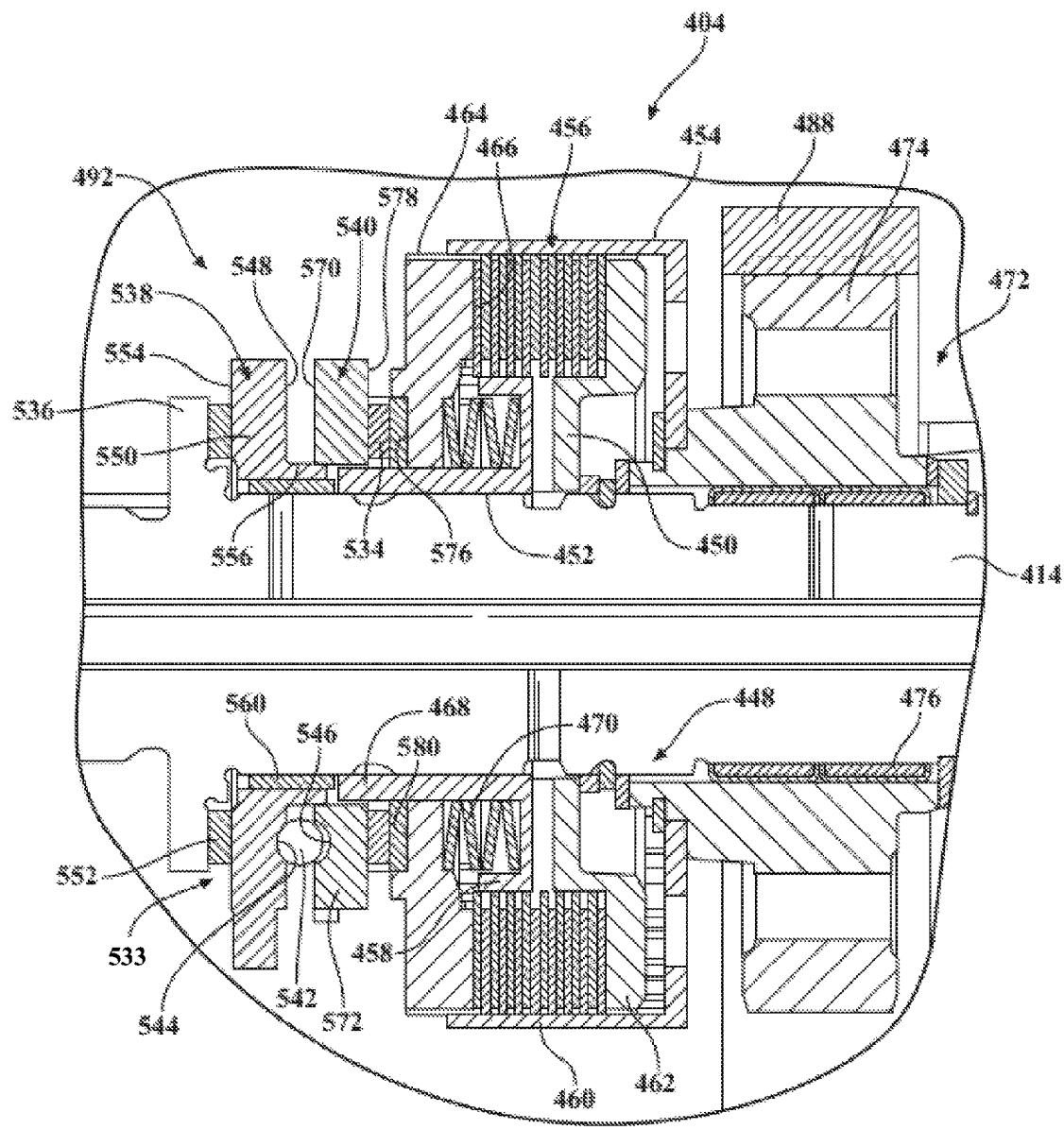
FIG. 12 is an enlarged partial view of various components associated with the mode clutch used in the active two-speed transfer case shown in FIGS. 9 and 10.

Referring primarily to FIG. 12, mode mechanism 404 is shown to include a mode clutch 448 having a clutch hub 450 fixed via a splined connection 452 for rotation with rear output shaft 414, a clutch drum 454, and a multi-plate clutch pack 456 operably disposed between clutch hub 450 and clutch drum 454 fixed for rotation with first sprocket 474. As seen, clutch pack 456 includes a set of inner clutch plates splined to a cylindrical rim segment 458 of clutch hub 450 and which are alternately interleaved with a set of outer clutch plates splined to a cylindrical rim segment 460 of clutch drum 454. Clutch pack 456 is retained for limited sliding movement between a reaction plate segment 462 of clutch hub 450 and a pressure plate 464. Pressure plate 464 has a face surface 466 adapted to engage and apply a compressive clutch engagement force on clutch pack 456. Pressure plate 464 is splined to rim segment 458 for common rotation with clutch hub 450 and is further supported for sliding movement on a tubular sleeve segment 468 of clutch hub 450. A return spring 470 is provided between clutch hub 450 and pressure plate 464 for normally biasing pressure plate 464 away from engagement with clutch pack 456.

Upon engagement of mode clutch 448, drive torque is transmitted from rear output shaft 414 through clutch pack 456 and a transfer mechanism 472 to front output shaft 420. Transfer mechanism 472 is a chain drive unit shown to include a first sprocket 474 rotatably supported by bearing assemblies 476 on rear output shaft 414, a second sprocket 478 fixed via splined connection 480 to front output shaft 420, and a power chain 487 encircling first sprocket 474 and second sprocket 478. Clutch drum 454 is fixed for rotation with first sprocket 474 such that drive torque transferred through mode clutch 448 is transmitted through transfer mechanism 472 to front output shaft 420. Accordingly, transfer mechanism 472 forms part of the torque transfer arrangement of transfer case 400.

Pressure plate 464 is axially moveable relative to clutch pack 456 between a first or "fully released" position and a second or "fully engaged" position. With pressure plate 464 in its fully released position, a minimum clutch engagement force is exerted on clutch pack 456 such that virtually no drive torque is transferred through mode clutch 448 so as to establish the two-wheel drive (2WD) mode. Return spring 470 is arrangement to normally urge pressure plate 464 toward its fully released position. In contrast, location of pressure plate 464 in its fully engaged position causes a maximum clutch engagement force to be applied to clutch pack 456 such that front output shaft 420 is, in effect, coupled via transfer mechanism 472 for common rotation with rear output shaft 414 so as to establish the locked or "part-time" four-wheel drive (LOCK-4WD) mode. Therefore, accurate control of the position of pressure plate 464 between its fully released and fully engaged positions permits adaptive regulation of the amount of torque transfer between rear output shaft 414 and front output shaft 420, thereby permitting establishment of an adaptive or "on-demand" four-wheel drive (AUTO-4WD) mode.

Power-operated shift mechanism 406 is operable to coordinate movement of range collar 440 between its three distinct range positions with movement of pressure plate 464 between its fully released and fully engaged positions. Shift mechanism 406 includes an electric motor 486, an actuator shaft 488 rotatably driven by electric motor 486, a range clutch actuator 490, and a mode clutch actuator 492. Actuator shaft 488 has its opposite ends supported by a pair of laterally-spaced bearing assemblies 494 for rotation in housing 410 about a third rotary axis. A reduction geartrain 496 provides a drive connection between a rotary output of electric motor 486 and actuator shaft 488. Reduction geartrain 496 includes a worm gearset (not shown) that is driven by the rotary output of electric motor 486 and a spur gearset 498. Actuation of electric motor 486 causes the worm gearset to drive a drive gear 500 associated with gearset 498. Specifically, drive gear 500 is a small diameter gear supported for rotation on an idler shaft 501 and which is meshed with a large diameter driven gear 502 fixed for rotation with actuation shaft 488. In particular, driven gear 502 includes a tubular hub segment 504 that is fixed via a splined connection 506 to actuator shaft 488 between a radial shaft flange 508 and rear bearing assembly 494. The cumulative reduction ratio provided by geartrain 496 permits the use of a smaller, low power electric motor.

Figure 13:
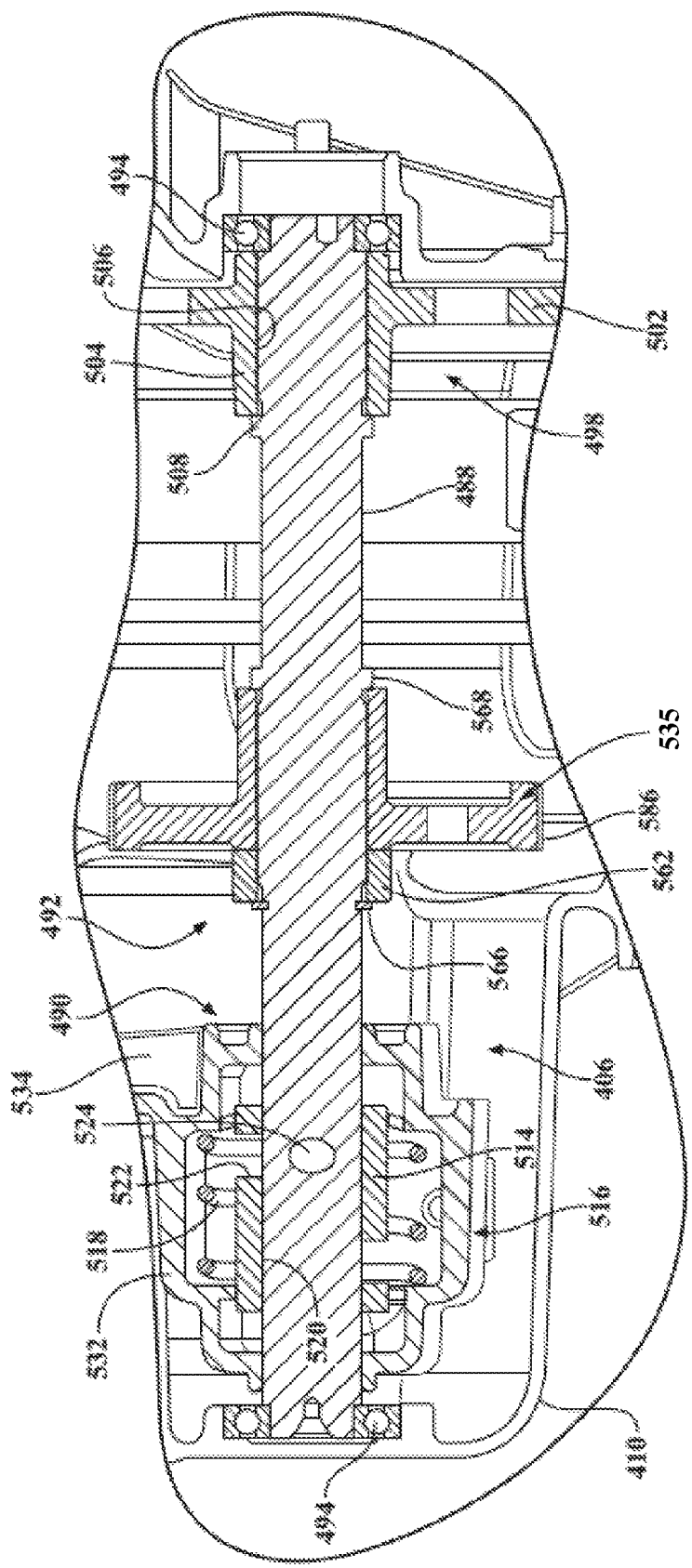
FIG. 13 is an enlarged partial view of various components associated with a clutch actuator used in the active two-speed transfer case shown in FIGS. 9 and 10.
Figure 14:
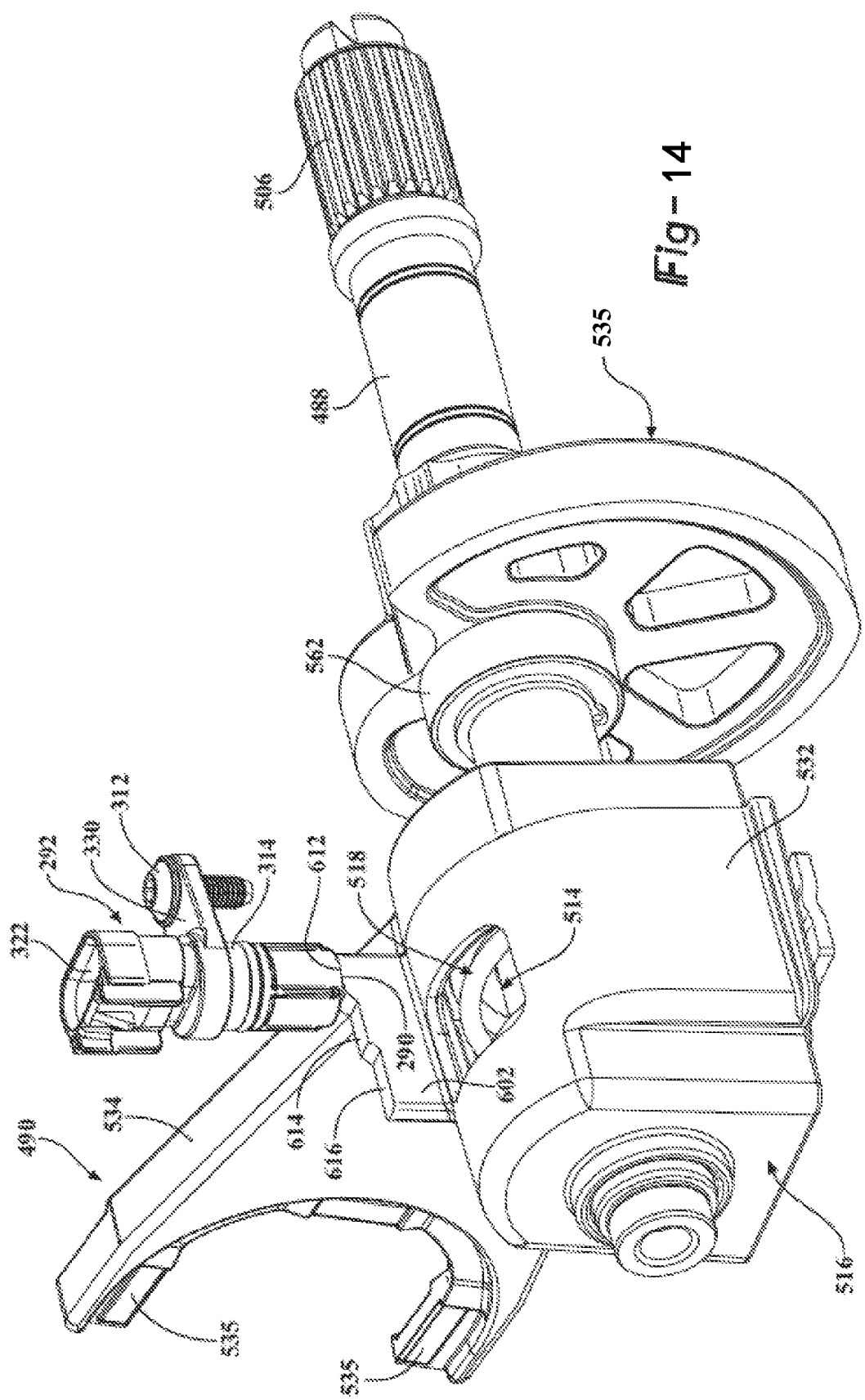
FIG. 14 is an isometric view of an actuator shaft assembly associated with the clutch actuator equipped with a range fork unit and a contactless sensing arrangement.
Figure 15:
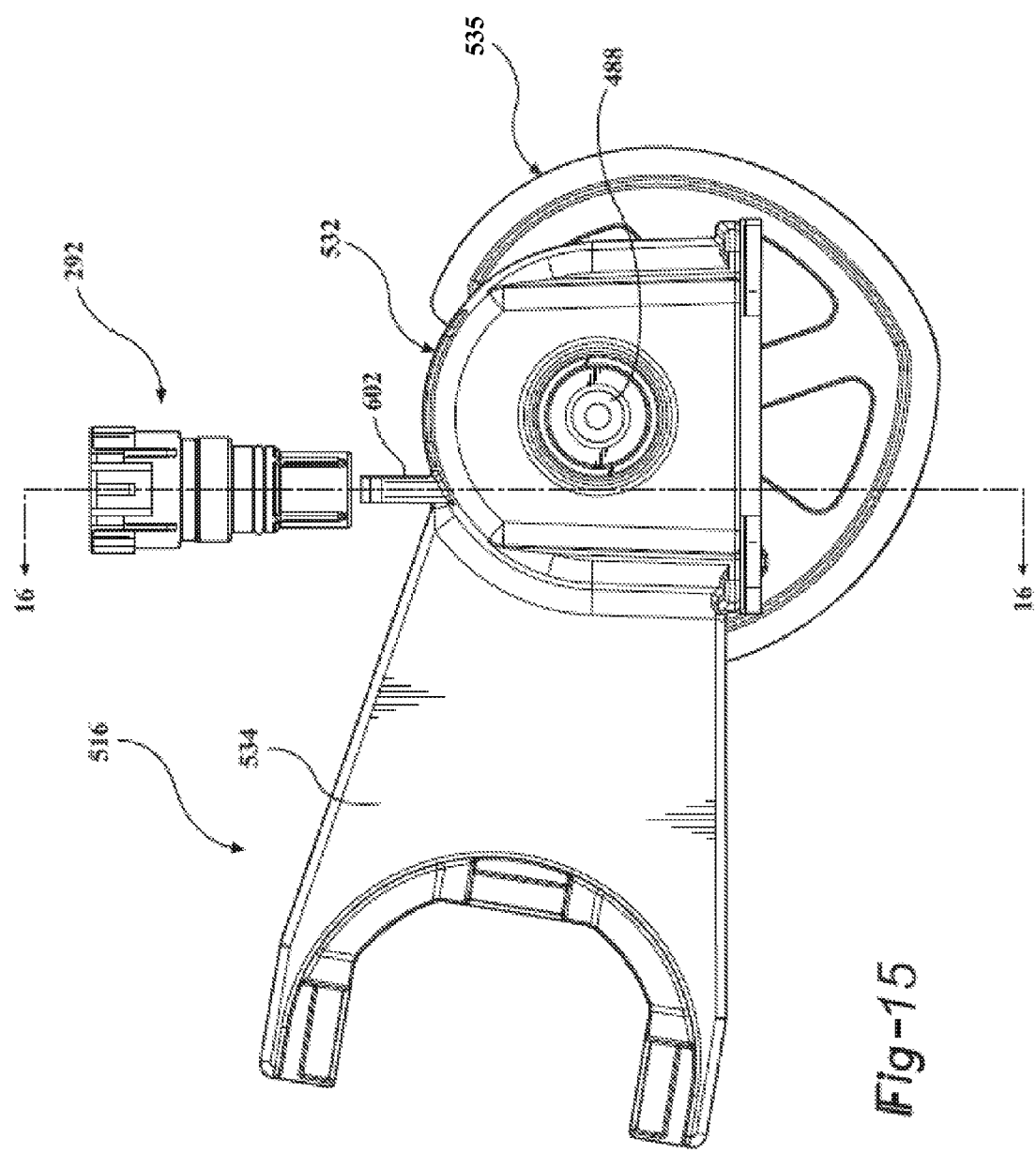
FIG. 15 is a side elevational view of FIG. 14 showing additional details of the contactless sensing arrangement associated with the range fork unit.

Range clutch actuator 490 is operable to convert bi-directional rotary motion of actuator shaft 488 into bi-directional translational movement of range collar 440 between its three distinct range positions. Referring primarily to FIGS. 13 through 15, range clutch actuator 490 is shown to generally include a range cam 514, a range fork 516, and a spring-biasing unit 518. Range cam 514 is a tubular member having an inner diameter surface 520 journalled for sliding movement on actuator shaft 488. An elongated range slot 522 is formed in range cam 514 and receives a follower pin 524 that is fixed for rotation with actuator shaft 488. Range slot 522 includes a high-range dwell segment, a low-range dwell segment, and a helical shift segment interconnecting the dwell segments. Range fork 516 includes a sleeve segment 532 supported for sliding movement on actuator shaft 488 and a fork segment 534 having bifurcated ends 535 which extend into an annular groove 536 formed in range collar 440. Sleeve segment 532 defines an interior chamber 537 within which range cam 514 and spring-biasing unit 518 are located. Spring-biasing unit 518 is operably disposed between range cam 514 and sleeve segment 532 of range fork 516. Spring-biasing unit 518 functions to urge range fork 516 to move axially in response to axial movement of range cam 514 while its spring compliance accommodates tooth "block" conditions that can occur between range collar clutch teeth 442 and input shaft clutch teeth 444 or carrier clutch teeth 446. As such, spring-biasing unit 518 assures that range fork 516 will complete axial movement of range collar 440 into its H and L range positions upon elimination of any such tooth block condition.

Range clutch actuator 490 is arranged such that axial movement of range cam 514 results from movement of follower pin 524 within the shift segment of range slot 522 in response to rotation of actuator shaft 488. As noted, such movement of range cam 514 causes range fork 516 to move range collar 440 between its three distinct range positions. Specifically, when it is desired to shift range clutch 428 into its high-range drive mode, electric motor 486 rotates actuator shaft 488 in a first direction which, in turn, causes concurrent rotation of follower pin 524. Such rotation causes follower pin 524 to move within the shift segment of range slot 522 for axially moving range cam 514 and range fork 516 until range collar 440 is located in its H range position. With range collar 440 in its H range position, the high-range drive connection is established between input shaft 408 and rear output shaft 414. Continued rotation of actuator shaft 488 in the first direction causes follower pin 524 to exit the shift segment of range slot 522 and enter the high-range dwell segment for preventing further axial movement of range cam 514, thereby maintaining range collar 440 in its H range position. As will be detailed, the length of the high-range dwell segment of range slot 522 is selected to permit sufficient additional rotation of actuator shaft 488 in the first rotary direction to accommodate actuation of mode clutch by mode clutch actuator 492.

With range collar 440 in its H range position, subsequent rotation of actuator shaft 488 in the opposite or second direction causes follower pin 524 to exit the high-rang dwell segment and re-enter the helical shift segment of range slot 522 for causing range cam 514 to begin moving range collar 440 from its H range position toward its L range position. Upon continued rotation of actuator shaft 488 in the second direction, follower pin 524 exits the shift segment of range slot 522 and enters the low-range dwell segment for locating and maintaining range collar 440 in its L range position, whereby the low-range drive connection between planet carrier 436 and rear output shaft 414 is established. Again, the length of the low-range dwell segment of range slot 522 is selected to permit additional rotation of actuator shaft 488 in the second rotary direction required to accommodate complete actuation of mode clutch 448.

Mode clutch actuator 492 is operable to convert bi-directional rotary motion to actuator shaft 488 into bi-directional translational movement of pressure plate 464 between its fully released and fully engaged positions so as to permit adaptive regulation of the drive torque transferred through mode clutch 448 to front output shaft 420. In generally, mode clutch actuator 492 includes a ballramp unit 533 and a mode cam 535. Ballramp unit 533 is supported on rear output shaft 414 between a radial shaft flange 536 and pressure plate 464. Ballramp unit 533 includes a first cam member 538, a second cam member 540, and balls 542 disposed in aligned sets of tapered grooves 544 and 546 formed in corresponding face surfaces of cam members 538 and 540. In particular, grooves 544 are formed in a first face surface 548 on a cam ring segment 550 of first cam member 538. As seen, a thrust bearing assembly 552 is disposed between shaft flange 536 and a second face surface 554 of cam ring segment 550. First cam member 538 further includes a tubular sleeve segment 556 and an elongated lever segment 558. Sleeve segment 556 is supported on rear output shaft 414 via a bearing assembly 560. Lever segment 558 has a terminal end portion engaging a spacer collar 562 that is piloted on and able to rotate relative to actuator shaft 488. A lock ring 566 axially locates spacer collar 562 and mode cam 535 relative to a radial shaft flange 568.

Second cam member 540 of ballramp unit 533 has its grooves 546 formed in a first face surface 570 of a cam ring segment 572 that is shown to generally surround portions of sleeve segment 556 of first cam member 538 and sleeve segment 468 of clutch 450. A thrust bearing assembly 574 and thrust ring 576 are disposed between a second face surface 578 of cam ring segment 572 and a face surface 580 of pressure plate 464. Second cam member 540 further includes an elongated lever segment 582 having a mode follower 584 mounted at its terminal end that rollingly engages a cam surface 586 formed on an outer peripheral edge of mode cam 535. As will be understood, the contour of cam surface 586 on mode cam 535 functions to control angular movement of second cam member 540 relative to first cam member 538 in response to rotation of actuator shaft 488. Such relative angular movement between cam members 538 and 540 causes balls 542 to travel along the tapered grooves and which, in turn, causes axial movement of second cam member 540. Such axial movement of second cam member 540 functions to cause corresponding axial movement of pressure plate 464 between its fully released and fully engaged positions, thereby controlling the magnitude of the clutch engagement force applied to clutch pack 456.

As seen, lever segment 582 of second cam member 540 is located on one side of actuator shaft 448 while lever segment 558 of first cam member 538 is located on the opposite side of actuator shaft 448. Due to engagement of mode follower 584 with cam surface 586 on mode cam 535, second cam member 540 is angularly moveable relative to first cam member 538 between a first or "retracted" position and a second or "extended" position in response to rotation of actuator shaft 448. With second cam member 540 rotated to its retracted position, return spring 470 biases pressure plate 464 to its fully released position which, in turn, urges balls 542 to be located in deep end portions of aligned grooves. Thus, such movement of second cam member 540 to its angularly retracted position relative to first cam member 538 also functions to locate second cam member 540 in an axially retraced position relative to clutch pack 456. While not shown, a biasing unit may be provided between lever segments 558 and 582 to assist return spring 470 in normally urging second cam member 540 toward its retracted position. In contrast, angular movement of second cam member 540 to its extended position causes balls 542 to be located in shallow end portions of the aligned grooves which cause axial movement of second cam member 540 to an axially extended position relative to clutch pack 456. Such axial movement of second cam member 540 causes pressure plate 464 to be moved to its fully engaged position in opposition to the biasing exerted thereon by return spring 470. Accordingly, control of angular movement of second cam member 540 between its retracted and extended positions functions to control concurrent movement of pressure plate 464 between its fully released and fully engaged positions.

As previously noted, cam surface 586 of mode cam 535 and range slot 522 of range cam 514 are configured to coordinate movement of range collar 440 and pressure plate 464 in response to rotation of actuator shaft 488 for establishing a plurality of different drive modes. According to one possible arrangement, mode selector 60 could permit the vehicle operator to select from a number of different two-wheel and four-wheel drive modes including, for example, two-wheel high-range drive 2H mode, the on-demand four-wheel high-range drive (AUTO-4H) mode, the part-time four-wheel high-range drive (LOCK-4H) mode, a Neutral (N) mode and a part-time four-wheel low-range drive (LOCK-4L) mode. Specifically, control system 54 functions to control the rotated position of actuator shaft 488 in response to the mode signal delivered to ECU 56 by mode selector 60 and the sensor input signals sent by sensors 58 to ECU 56.

Figure 16:
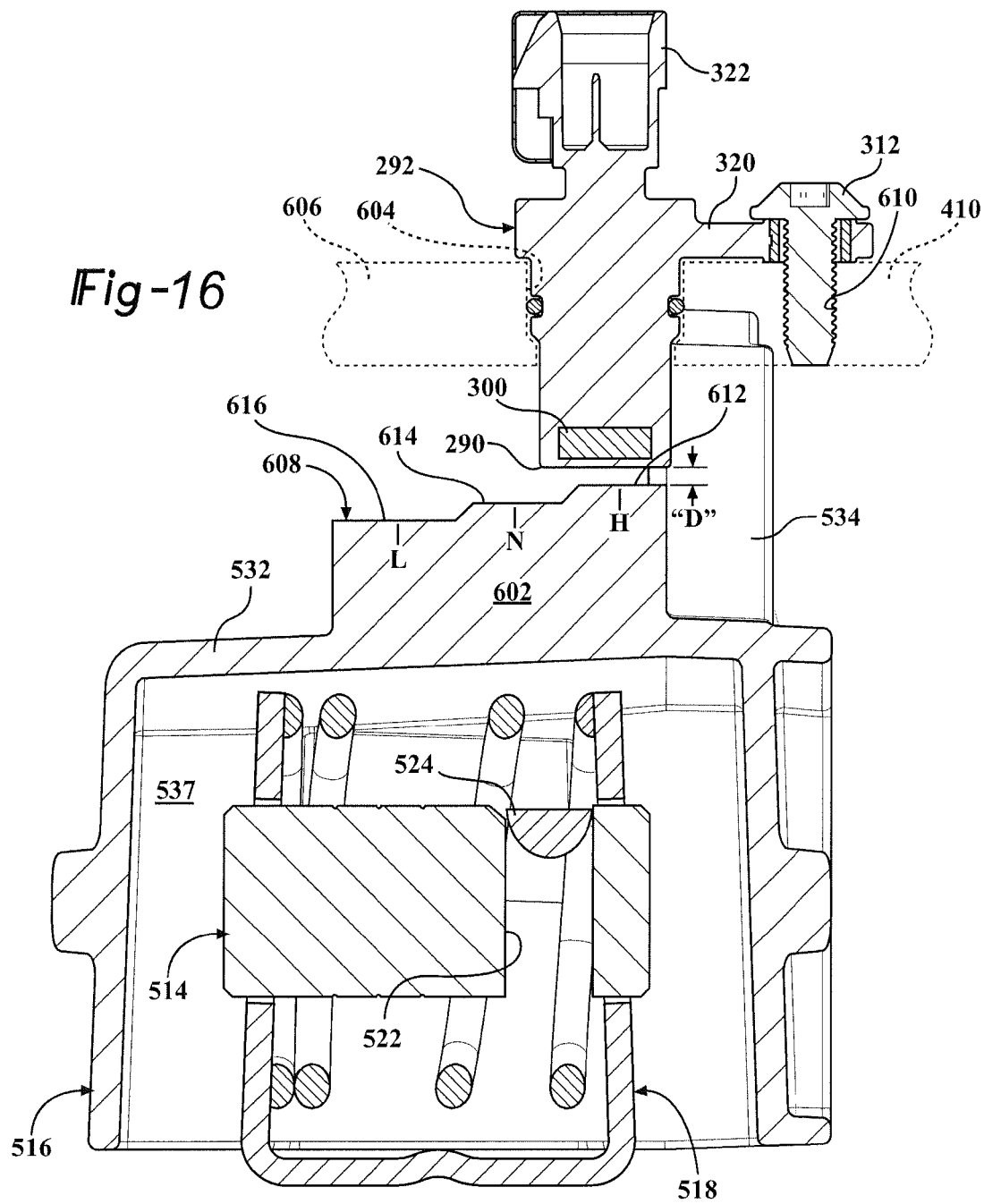
FIG. 16 is a sectional view taken generally along line 16-16 of FIG. 15 showing the relationship between the range fork unit and the contactless sensing arrangement in greater detail.
Figure 17:
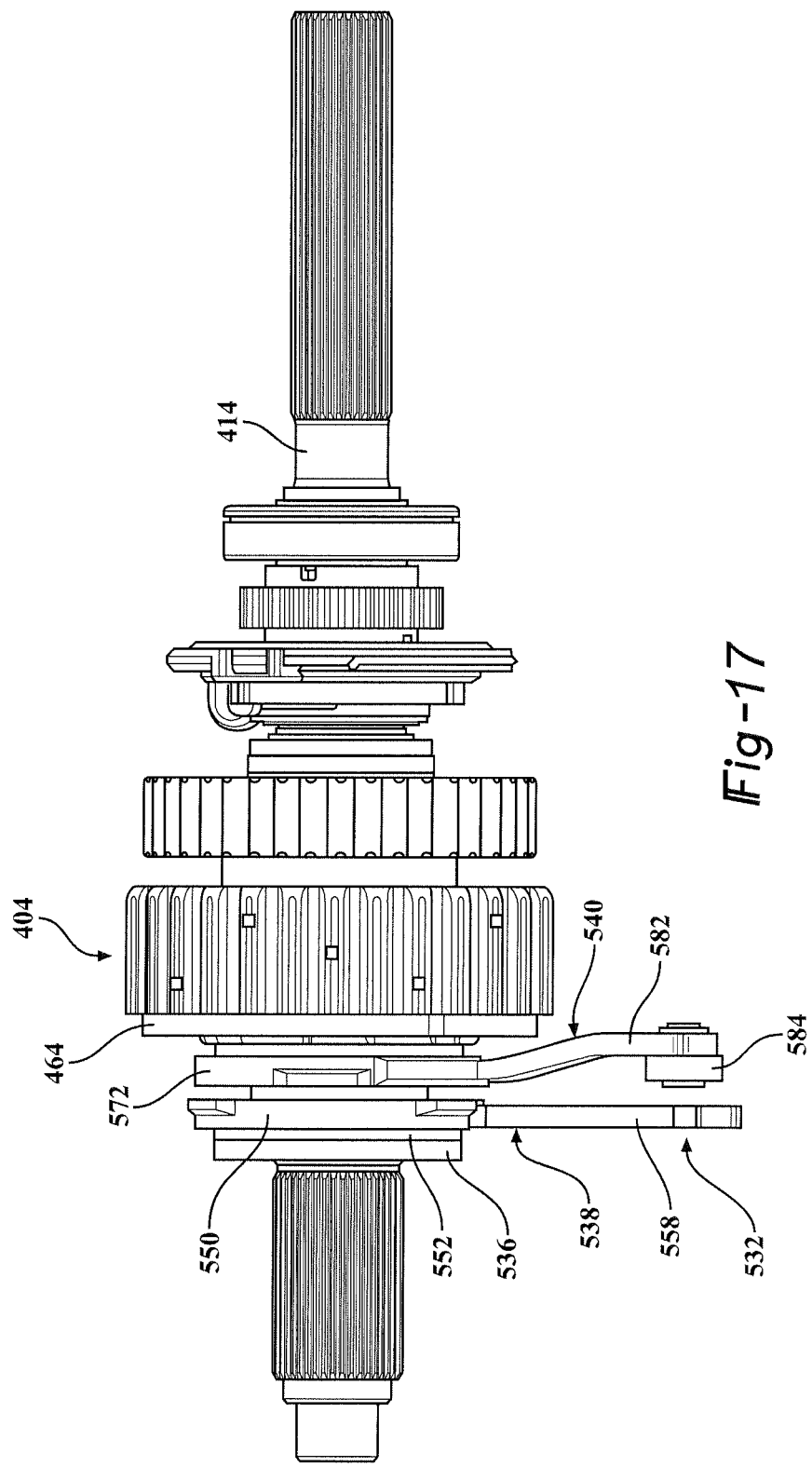
FIG. 17 is a side view of a rear output shaft assembly for the active two-speed transfer case of FIGS. 9 and 10.

As best seen from FIGS. 14 through 16, a "noncontact" sensing arrangement 600 is provided in association with range fork 516 and generally includes a contactless position sensor, such as Hall Effect sensor 292, and a tracking plate 602 fixed to or formed integrally on tubular segment 532 of range fork 516. The components and function of Hall Effect sensor 292 are common to those described previously with such components again identified with common reference numeral. Sensor 292 extends through a throughbore 604 formed in an external surface 606 of housing 410 so as to align end surface 290 of sensor 292 to an edge surface 608 of tracking plate 602 on range fork 516. Threaded fastener 312 is again used to secure position sensor 292 to surface 606 of housing 410 and is retained in a mounting bore 610 formed therein.

Range fork 516 is shown located in a first fork position, identified by line H, indicative of the axial position of range fork 516 required to locate range collar 440 in its H range position. In the first fork position, a first planar tracking surface 612 formed on edge 608 of tracking plate 602 is aligned with end surface 290 of position sensor 292 with a first predetermined distance "$D_1$" established therebetween. Axial movement of range fork 516 in a first direction from its first fork position into a second fork position, identified by line "N", is indicative of the axial position of range fork 516 required to locate range collar 440 in its N range position. In this second fork position, a second planar tracking surface 614 formed on edge 608 of tracking plate 602 is aligned with end surface 290 of position sensor 292 with a second predetermined distance "$D_2$" established therebetween. The second distance $D_2$ is greater than the first distance $D_1$. Continued axial movement of range fork in the first direction from its second fork position into a third fork position, identified by line "L", is indicative of the axial position of range fork 516 required to locate range collar 440 in its L range position. With range fork 516 in its third fork position, a third planar tracking surface 616 formed on edge 608 of tracking plate 602 is aligned with end surface 290 of position sensor 292 with a third predetermined distance "$D_3$" established therebetween. The third distance $D_3$ being greater than the second distance $D_2$.

This non-contacting sensing arrangement utilizes the staggered or stepped edge profile of tracking plate 602 of range fork 516 to establish three (3) distinct target distances ($D_1$-$D_3$) between stationary position sensor 292 and axially moveable range fork 516 to be used in identifying and signaling the axial position of range collar 440. Obviously, axial movement of range fork 516 in an opposite second direction permits tracking plate 602 and contactless sensor 292 to track movement of range collar 440 from its L range position back to its H range position.

This sensing arrangement 600 is an improvement over prior art systems configured to detect the rotated or axial position of the actuator/shift shaft in view of the fact that a spring-biasing unit is typically provided between the moveable shaft and the range collar. Accordingly, the present disclosure provides direct detection of the axial position of range fork 516 which, in turn, correlates directly to the position of range collar 440, thereby eliminating the potential positional error associated with prior designs.

In accordance with the present disclosure, a contactless position sensor can be mounted on an external surface of the transfer case housing and extend into an internal portion thereof for detecting movement (rotary or axial) of a shift component. The contactless sensor preferably uses Hall Effect sensing technology to measure the magnetic flux developed between its magnet and the tracking surfaces formed on the ferrous rotary component (sector plate 154) or on the ferrous axial component (range fork). Position sensor 292 generates a variable output signal as a result of sensing the distance (i.e., $D_1$-$D_N$) between the magnet and the tracking surface. The contactless position sensor is configured to detect target surfaces in the range of 1-15 millimeters and preferably in a non-limiting range of 2-9 millimeters for providing a plurality of distinct tracking distances. Sector plate 154, 154' is rotatable through a range of angular travel of about 60°, preferably in increments of 20°, between the four range position (2H to LOCK-4L) associated with sector plate 154 of FIG. 8 and sector plate 154' of FIG. 6.

Contactless position sensor 292 is capable of detecting these four distinct positions with an accuracy of about ±1.5°. Sensor 292 is preferably a contactless position sensor using a high precision, highly programmable linear Hall Effect sensor IC with EEPROM and a back-biased magnet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A transfer case for use in a four-wheel drive motor vehicle having a powertrain and first and second drivelines, comprising:
    an input shaft adapted to receive drive torque from the powertrain and aligned for rotation about a first axis;
    a first output shaft adapted to be interconnected to the first driveline and aligned for rotation about said first axis;
    a second output shaft adapted to be interconnected to the second driveline and aligned for rotation about a second axis;
    a transfer mechanism having a first transfer component fixed for rotation with said first output shaft about said first axis, and a second transfer component rotatably supported on said second output shaft for rotation about said second axis, said second transfer component being driven by said first transfer component;
    a range mechanism including a reduction unit and a range clutch, said reduction unit being driven at a reduced speed relative to said input shaft, said range clutch operable in a first range position to establish a drive connection between said input shaft and said first output shaft and further operable in a second position to establish a drive connection between said reduction unit and said first output shaft;
    a range shift mechanism controlling movement of said range clutch between said first and second positions, said range shift mechanism including a rotary-to-linear conversion device having a rotary sector plate configured to convert rotation of said sector plate between first and second rotary positions into movement of said range clutch between its first and second range positions; and
    a non-contact sensing arrangement configured to detect the rotated position of said sector plate and including a contactless sensor having a sensing surface aligned with an edge surface of said sector plate, said edge surface of said sector plate defining a first tracking surface displaced from said sensing surface by a first distance when said sector plate is located in its first position and further defining a second tracking surface displaced from said sensing surface by a second distance when said sector plate is located in its second position, wherein said first distance is different than said second distance.

2. The transfer case of claim 1 wherein said first and second tracking surfaces formed on said edge surface of said sector plate are arcuate and offset by a dimension equivalent to the difference between said first distance and said second distance.

3. The transfer case of claim 2 wherein said contactless sensor is a Hall Effect sensor that is fixed to a stationary housing.

4. The transfer case of claim 3 wherein said Hall Effect sensor includes a casing which extends through a through-bore formed in said housing so as to position said sensing end surface in close proximity to said edge surface of said sector plate.

5. The transfer case of claim 1 wherein said sector plate is rotated manually between its first and second rotated positions.

6. The transfer case of claim 1 wherein said range shift mechanism includes a power-operated actuator for moving said sector plate between its first and second rotated positions.

7. The transfer case of claim 1 wherein said range clutch is operable in a third range position to disconnect said input shaft from a drive connection with said first output shaft and said reduction unit, wherein said sector plate is configured to rotate to a third position for moving said range clutch to said third range position, and wherein said edge surface of said sector plate includes a third tracking surface displaced from said sensing surface of said sensor by a third distance when said sector plate is located in its third position, said third distance being greater than one of said first and second distances and being less than the other one of said first and second distances.

8. The transfer case of claim 1 further comprising:
    a mode mechanism disposed between said second transfer component and said second output shaft, said mode mechanism including a mode clutch operable in a first mode position to uncouple said second transfer component from said second output shaft to establish a two-wheel drive mode and further operable in a second mode position to couple said second transfer component to said second output shaft to establish a four-wheel drive mode;
    a mode shift mechanism for controlling movement of said mode clutch between said first and second mode positions; and
    a power-operated actuator for controlling actuation of said mode shift mechanism.

9. The transfer case of claim 8 wherein said sector plate is configured to move said mode clutch between its first and second mode positions in coordination with movement of said range clutch between its first and second range positions, and wherein said power-operated actuator is configured to rotate said sector plate between its first and second rotated positions.

10. The transfer case of claim 9 wherein said sector plate includes third and fourth tracking surfaces formed on its edge surface which define third and fourth distances in relation to said sensing surface of said sensor, and wherein said third and fourth distances are different from each other and also different from said first and second distances.

11. The transfer case of claim 1 wherein said reduction unit is a planetary gearset having a sun gear driven by said input shaft, a non-rotary ring gear, a carrier, and a plurality of planet gears each rotatably supported by said carrier and in meshed engagement with said sun gear and said ring gear, wherein said range clutch includes a range collar coupled for rotation with and sliding movement on said first output shaft, wherein said range collar is operable in said first range position to couple said sun gear for rotation with said first output shaft and is further operable in said second range position to couple said carrier for rotation with said first output shaft.

12. The transfer case of claim 1 wherein said transfer mechanism includes a first sprocket drivingly coupled to said first output shaft, a second sprocket rotatably supported on said output shaft, and a power chain encircling said first and second sprockets for transferring drive torque from said first output shaft to said second sprocket, wherein said first clutch member is a clutch drum fixed for rotation with said second sprocket and said second clutch member is a clutch hub fixed for rotation with said second shaft.

13. A transfer case for use in a four-wheel drive motor vehicle having a powertrain and first and second drivelines, comprising:
an input shaft adapted to receive drive torque from the powertrain and aligned for rotation about a first axis;
a first output shaft adapted to be interconnected to the first driveline and aligned for rotation about said first axis;
a second output shaft adapted to be interconnected to the second driveline and aligned for rotation about a second axis;
a transfer mechanism having a first transfer component supported on said first output shaft for rotation about said first axis, and a second transfer component fixed to said second output shaft for rotation about said second axis, said first transfer component being driven by said second transfer component;
a range mechanism including a reduction unit and a range clutch, said reduction unit being driven at a reduced speed relative to said input shaft, said range clutch operable in a first range position to establish a drive connection between said input shaft and said first output shaft and further operable in a second position to establish a drive connection between said reduction unit and said first output shaft;
a range shift mechanism controlling movement of said range clutch between said first and second positions, said range shift mechanism including a rotary-to-linear conversion device having a rotary sector plate configured to convert rotation of said sector plate between first and second rotary positions into movement of said range clutch between its first and second range positions; and
a non-contact sensing arrangement configured to detect the rotated position of said sector plate and including a contactless sensor having a sensing surface aligned with an edge surface of said sector plate, said edge surface of said sector plate defining a first tracking surface displaced from said sensing surface by a first distance when said sector plate is located in its first position and further defining a second tracking surface displaced from said sensing surface by a second distance when said sector plate is located in its second position, wherein said first distance is different than said second distance.

14. The transfer case of claim 13 wherein said first and second tracking surfaces formed on said edge surface of said sector plate are arcuate and offset by a dimension equivalent to the difference between said first distance and said second distance.

15. The transfer case of claim 14 wherein said contactless sensor is a Hall Effect sensor that is fixed to a stationary housing.

16. The transfer case of claim 15 wherein said Hall Effect sensor includes a casing which extends through a throughbore formed in said housing so as to position said sensing end surface in close proximity to said edge surface of said sector plate.

17. The transfer case of claim 13 wherein said range clutch is operable in a third range position to disconnect said input shaft from a drive connection with said first output shaft and said reduction unit, wherein said sector plate is configured to rotate to a third position for moving said range clutch to said third range position, and wherein said edge surface of said sector plate includes a third tracking surface displaced from said sensing surface of said sensor by a third distance when said sector plate is located in its third position, said third distance being greater than one of said first and second distances and being less than the other one of said first and second distances.

18. The transfer case of claim 13 further comprising:
a mode mechanism disposed between said first transfer component and said first output shaft, said mode mechanism including a mode clutch operable in a first mode position to uncouple said first transfer component from said second output shaft to establish a two-wheel drive mode and further operable in a first mode position to couple said first transfer component to said first output shaft to establish a four-wheel drive mode;
a mode shift mechanism for controlling movement of said mode clutch between said first and second mode positions; and
a power-operated actuator for controlling actuation of said mode shift mechanism.

19. The transfer case of claim 18 wherein said sector plate is configured to move said mode clutch between its first and second mode positions in coordination with movement of said range clutch between its first and second range positions, and wherein said power-operated actuator is configured to rotate said sector plate between its first and second rotated positions.

20. The transfer case of claim 19 wherein said sector plate includes third and fourth tracking surfaces formed on its edge surface which define third and fourth distances in relation to said sensing surface of said sensor, and wherein said third and fourth distances are different from each other and also different from said first and second distances.

21. The transfer case of claim 13 wherein said reduction unit is a planetary gearset having a sun gear driven by said input shaft, a non-rotary ring gear, a carrier, and a plurality of planet gears each rotatably supported by said carrier and in meshed engagement with said sun gear and said ring gear, wherein said range clutch includes a range collar coupled for rotation with and sliding movement on said first output shaft, wherein said range collar is operable in said first range position to couple said sun gear for rotation with said first output shaft and is further operable in said second range position to couple said carrier for rotation with said first output shaft.

* * * * *